US009226281B2

(12) United States Patent
Wang et al.

(10) Patent No.: US 9,226,281 B2
(45) Date of Patent: Dec. 29, 2015

(54) METHOD AND APPARATUS FOR GENERATING/PARSING RESOURCE ALLOCATION INDICATION MESSAGE

(75) Inventors: Hai Wang, Beijing (CN); Qi Wu, Beijing (CN); Seong-Hyeon Chae, Seoul (KR); Xufeng Zheng, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 526 days.

(21) Appl. No.: 13/519,758

(22) PCT Filed: Dec. 23, 2010

(86) PCT No.: PCT/KR2010/009262
§ 371 (c)(1),
(2), (4) Date: Jun. 28, 2012

(87) PCT Pub. No.: WO2011/081355
PCT Pub. Date: Jul. 7, 2011

(65) Prior Publication Data
US 2012/0289273 A1 Nov. 15, 2012

(30) Foreign Application Priority Data

Dec. 31, 2009 (CN) .......................... 2009 1 0206785

(51) Int. Cl.
*H04W 72/04* (2009.01)
(52) U.S. Cl.
CPC .................................. *H04W 72/042* (2013.01)
(58) Field of Classification Search
CPC .. H04W 72/04; H04W 72/005; H04W 72/042
USPC ...................... 455/450–452.1, 509
See application file for complete search history.

(56) References Cited

U.S. PATENT DOCUMENTS

| 2009/0201871 A1* | 8/2009 | Sambhwani et al. ......... 370/329 |
| 2010/0048165 A1* | 2/2010 | Caldwell et al. ............. 455/406 |
| 2010/0135196 A1* | 6/2010 | Cheng et al. .................. 370/312 |

FOREIGN PATENT DOCUMENTS

| AU | 2009209844 B2 | 11/2012 |
| CN | 101132598 A | 2/2008 |
| CN | 101562839 A | 10/2009 |
| JP | 2011-511546 A | 4/2011 |
| KR | 10-2007-0042851 A | 4/2007 |
| KR | 10-2009-0093760 A | 9/2009 |
| WO | 2009/072842 A2 | 6/2009 |

OTHER PUBLICATIONS

Josiam et al., "Proposed Text for Section 16.9.3.1 E-MBS Configuration Indicators", IEEE C802.16m-09/2779, Dec. 30, 2009.
Josiam et al., "Slides in support of the Proposed Text for Section 16.9.3.1 E-MBS Configuration Indicators", IEEE S80216m-09_2779, Dec. 30, 2009.

* cited by examiner

*Primary Examiner* — Raymond Dean
(74) *Attorney, Agent, or Firm* — Jefferson IP Law, LLP

(57) ABSTRACT

A method, a transmitter and a receiver for generating a resource allocation indication message are provided. The method includes, if M serving zones provide one of at least two service types, mapping each of one of N and N−1 resource units to a resource mapping identity represented by one bit, and generating the resource allocation indication message using at least one resource mapping identity, wherein the resource allocation indication message indicates the allocation of N resource units numbered for M serving zones, wherein the M is an integer equal to or larger than 1, and wherein the N is an integer equal to or larger than M.

32 Claims, 9 Drawing Sheets

FIG.6A

| 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|----|----|----|----|----|----|----|----|----|----|----|----|
| 0 | 0 | 0 | 0 | 1 | 0 | 0 | 0 | 0 | 0 | 0 | 1 | 0 | 0 | 0 | 0 | 0 | 0 | 0 | 0 | 1 |

SERVING ZONE 10 | SERVING ZONE 11 | SERVING ZONE 12 | SERVING ZONE 13

FIG.6B

| 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|----|----|----|----|----|----|----|----|----|----|----|----|
| 0 | 1 | 1 | 1 | 1 | 1 | 1 | 1 | 1 | 1 | 1 | 1 | 0 | 1 | 1 | 1 | 1 | 1 | 1 | 1 | 0 |

SERVING ZONE 10 | SERVING ZONE 11 | SERVING ZONE 12 | SERVING ZONE 13

FIG.6C

| 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|----|----|----|----|----|----|----|----|----|----|----|----|
| 0 | 1 | 1 | 1 | 1 | 1 | 1 | 1 | 1 | 1 | 1 | 0 | 0 | 0 | 0 | 0 | 0 | 0 | 0 | 0 | 1 |

SERVING ZONE 10 | SERVING ZONE 11 | SERVING ZONE 12 | SERVING ZONE 13

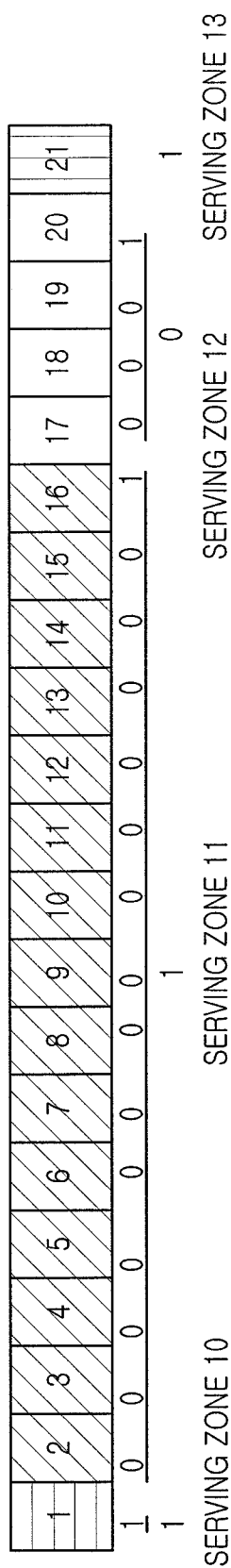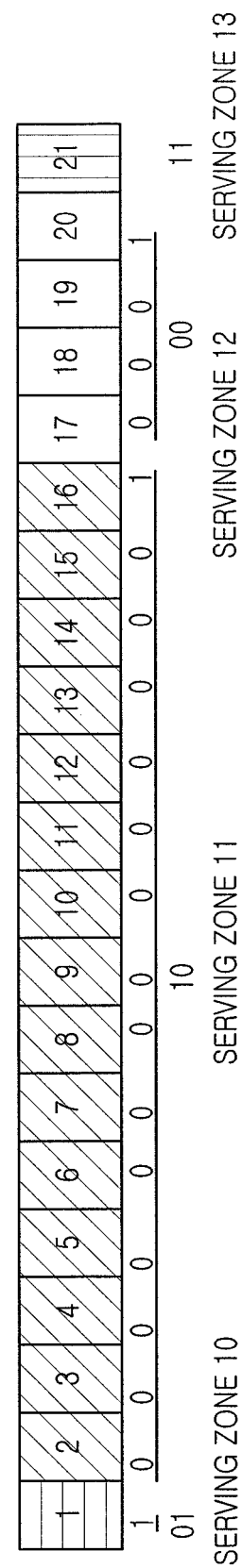
FIG.9A
FIG.9B

METHOD AND APPARATUS FOR GENERATING/PARSING RESOURCE ALLOCATION INDICATION MESSAGE

PRIORITY

This application is a National Stage application under 35 U.S.C. §371 of an International application filed on Dec. 23, 2010 and assigned application No. PCT/KR2010/009262, and claims the benefit under 35 U.S.C. §365(b) of a Korean patent application filed in the Chinese Industrial Property Office on Dec. 31, 2009 and assigned Serial No. 200910206785.7, the entire disclosure of which is hereby incorporated by reference.

BACKGROUND OF THE INVENTION

1. Field of the Invention

The present invention relates to the information transmission field. More particularly, the present invention relates to the indication of resource allocation of multiple serving zones.

2. Description of the Related Art

"Wireless+broadband" technologies have become a development trend of network, and there is severe competition between varieties of wireless communication systems in the broadband wireless access field. World Interoperability for Microwave Access Forum (WiMAX) is a remarkable broadband wireless access system, and has been in a scale test phase even in a commercial phase in Europe, America, Japan and Korea. The WiMAX system offers several advantages, including, a large coverage scope, a high transmission rate, support for high-speed movement, a high spectrum efficient, a high networking speed, and a low constructing cost. In addition to the popularity of trial-commercial or commercial actions, the WiMAX system will have a nice development foreground.

Along with increasing user requirements, multimedia services will be applied to Mobile Stations (MSs) frequently in the future, and the WiMAX system is very favorable to the development of streaming services. Along with the development of future mobile streaming services, the flux of a multicast service may be obviously higher than the flux of a unicast service in one MS.

The WiMAX access network bears Multicast and Broadcast Services (MBSs) through a common wireless connection. Two MBS access modes are defined in IEEE 802.16e: a single Base Station (BS) access mode and a multi BS access mode. The single BS access mode is implemented by MBS connections in one BS. For example, the MBS is operated separately in each BS, and in the BS, all MSs adopt the same Connection IDentifier (CID) for bearing MBS data and adopt the same Security Association (SA) parameter corresponding to the connection. Each involved MS receives data corresponding to the CID through a MAC layer and processes the data. In the multi BS access mode, multiple BSs constitute one MBS zone (e.g., referred to as MBS_Zone or E-MBS_Zone), each E-MBS zone has a unique zone identifier (e.g., referred to as E-MBS_Zone_ID). BSs in the same MBS_Zone synchronously transmit MBS data, and transmit a certain service flow by using the same MSTID and FID, so that the involved MSs can get effects from a macro diversity. The MSs obtains information of the MBS_Zone from broadcast information of the BSs. Each BS having an E-MBS capability belongs to a certain E-MBS zone, and one BS may belong to multiple MBS_Zones. In the multi BS access mode, a macro diversity mode may be adopted to improve receiving performance. In the macro diversity mode, BSs in the same MBS zone are required to synchronously transmit the same data by using the same frequency, symbol, sub-channel and modulation mode, which make an MS receive MBS data from multiple BSs at the same time, thereby improving the receiving reliability and receiving quality.

The mapping of an E-MBS zone on an air interface is resources occupied by the E-MBS zone, such as, for example, Resource Units (RUs) occupied by the E-MBS zone in a superframe/frame/subframe, which include one or more Physical Resource Units (PRUs), Continuous Resource Units (CRUs), Discrete Resource Units (DRUs) and Logical Resource Units (LRUs). The CRU may be divided into sub-band CRUs and miniband CRUs. If there is no confusion, the mapping of the E-MBS zone on the air interface is also called as the E-MBS zone.

As described above, one BS may belong to multiple E-MBS zones at the same time. In the macro diversity mode, the BSs in the same MBS zone are required to transmit the same data at the same time by using the same frequency, symbol, sub-channel and modulation mode. Thus, a transmitter similar to the BS in an information transmission system will transmit services of multiple serving zones to which the transmitter belongs, and the resources allocated to the serving zones need to be indicated and differentiated. For example, in BSs in an IEEE 802.16 communication system, there are multiple E-MBS zones.

FIG. 1 is a schematic diagram illustrating the a distribution of multiple serving zones and the an allocation of transmission resources according to the related art. For example, FIG. 1 shows a schematic diagram illustrating two E-MBS zones according to the related art.

Referring to FIG. 1, three BSs constitute two E-MBS zones, a BS 1 and a BS 2 belong to an E-MBS zone 1, and the BS 2 and a BS 3 belong to an E-MBS zone 2. Because the E-MBS zone 1 and the E-MBS zone 2 overlap partially, the two E-MBS zones cannot occupy the same resources on the air interface. A typical resource allocation mode is shown in the right of FIG. 1. The right of FIG. 1 shows a schematic diagram illustrating resource use on the air interface during transmission. The resources occupied by the E-MBS zone 1 on the air interface are indicated by a black zone, and the resources occupied by the E-MBS zone 2 on the air interface are indicated by a slash zone. The E-MBS zone on the BS 1 occupies the resources indicated by a black zone, the E-MBS zones on the BS 2 occupy the resources indicated by the black zone and the slash zone, and the E-MBS zone on the BS 3 occupies the resources indicated by the slash zone. Because the number of BSs constituting one E-MBS zone is optional, it can be leaned based on FIG. 1 that it is difficult to determine the number of E-MBS zones and the resource occupying state is very complex when there are multiple BSs in an actual system.

In the related art, in order to indicate resources occupied by multiple serving zones in a transmitter of an information transmission system, it is needed to indicate the number of multiple serving zones and to indicate a start point and an end point of each serving zone.

FIG. 2 is a schematic diagram illustrating a resource allocation of multiple serving zones according to the related art. For example, FIG. 2 shows a schematic diagram illustrating system resources which can be allocated logically.

Referring to FIG. 2, generally, the resources may be numbered orderly from 0 or 1. For example, the resources may be numbered as resources 0-18 or as resources 1-19 shown in FIG. 2. Because one serving zone may occupy one of or all of the resources, in order to indicate the serving zone, at least 5 bits are needed to indicate the start point of the serving zone, and at least 5 bits are needed to indicate the end point of the serving zone. Accordingly, a total of 10 bits are needed. If the number of serving zones to be indicated is between 1 and 8, 3 bits are needed to indicate the total number of serving zones. In this way, when the number of serving zones is 8, 10 bits are needed to indicate the start point and end point of each serving zone, and thus the overhead is 3+8*10=83 bits.

Therefore, in the information transmission system, in order to use multiple serving zones to provide services, a resource allocation indication method is required, which can indicate the allocation of multiple resource units between multiple serving zones, and which can decrease the overhead of resource allocation indication.

Therefore, a need exists for a system and method for generating a resource allocation indication message.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least above-mentioned problems and/or disadvantages and to provide at least the advantages described below. Accordingly, an aspect of the present invention is to provide a method for generating a resource allocation indication message. The resource allocation indication message indicates the allocation of N resource units numbered orderly from 1 to N for M serving zones numbered orderly from 1 to M, M is an integer equal to or larger than 1, and N is an integer equal to or larger than M, one or more continuous resource units are allocated to each serving zone, the M serving zones are adapted to provide a first-type service, or provide the first-type service and at least one kind of second-type services, and each serving zone provides one of the first-type service and the at least one kind of second-type services by using the allocated resource units. The method comprises steps in one of following cases:

a first case: the M serving zones provide one of the first-type service and the at least one kind of second-type services;
mapping each of N or N−1 resource units to a resource mapping identity represented by one bit; and
generating the resource allocation indication message by using resource mapping identities of the first N or N−1 resource units or resource mapping identities of the last N or N−1 resource units, a second case: the M serving zones provide the first-type service and the at least one kind of second-type services, where the first and/or the Mth serving zone provides the at least one kind of second-type services;
configuring respectively before the first resource unit and/or after the Nth resource unit a virtual resource unit 0 and/or a virtual resource unit N+1 for providing the first-type service or the at least one kind of second-type services;
mapping the virtual resource unit 0 or the virtual resource unit N+1 to a resource mapping identity represented by one bit according to that the virtual resource unit 0 or the virtual resource unit N+1 is used to provide which one of the first-type service and the at least one kind of second-type services;
mapping each of the N resource units, and the virtual resource unit N+1 or the virtual resource unit 0 to a resource mapping identity represented by one bit according to a resource mapping identity of the virtual resource unit 0 or the virtual resource unit N+1; and
generating the resource allocation indication message by using resource mapping identities of the N resource units and the resource mapping identity of the virtual resource unit N+1 or the virtual resource unit 0, a third case: the M serving zones provide the first-type service and the at least one kind of second-type services, where the at least one serving zones of the M serving zones may provide the at least one kind of second-type services;
mapping each of the N or N−1 resource units to a resource mapping identity represented by one bit;
mapping each of the M serving zones to a zone mapping identity; and
generating the resource allocation indication message by using resource mapping identities of the first N−1 or the last N−1 resource units and zone mapping identities of every serving zone.

According to aspects of the present invention, the number of the provided service types may be more than 2. For example, there may be a third service type and a fourth service type. When the number of the provided service types is more than 2, the zone mapping identities may correspond to multiple bits. For example, when there are four service types, the zone mapping identities may adopt 00, 01, 10 and 11.

When it is only needed to attend/indicate a certain type of services, services which do not belong to this service type may be taken as another type of services, and thus the number of service types is 2. In addition, serving zones which do not provide this type of services may be taken as serving zones providing another type of services. For example, the service type may include unicast, multicast, broadcast, location, relay or self-organizing network service. If it is only needed to attend/indicate first-type of services (e.g., multicast services), other types of services may be taken as a second-type of services. As described in the above, the second type of services may also be differentiated, at this time the number of service types is more than 2.

According to another aspect of the present invention, method for parsing the resource allocation indication message is provided.

According to another aspect of the present invention, a transmitter having a generating apparatus for generating resource allocation indication message is provided.

According to another aspect of the present invention, a receiver having a parsing apparatus of resource allocation indication message is provided.

In contrast to the method according to the related art, the methods according to aspects of the present invention have the following advantages: (1) the overhead of indication is unrelated to the number of serving zones to be indicated; even if the number of serving zones to be indicated is large, the overhead of system is still the same as the overhead of system generated when there is only one serving zone to be indicated; (2) the number of serving zones can be calculated according to the indication method of aspects of the present invention, and does not need to be indicated particularly, so as to save the overhead of indicating the number of serving zones; (3) the start point and end point of each serving zone can be indicated at the same time; (4) obvious advantages can be obtained when the number of serving zones to be indicated changes in a large range; (5) remarkable advantages can be obtained when the number of serving zones to be indicated is large.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 6A-6C and 7A-7B are schematic diagrams illustrating a resource allocation indication result in a case according to an exemplary embodiment of the present invention.

FIGS. 8A-8C are schematic diagrams illustrating a resource allocation indication result in another case according to an exemplary embodiment of the present invention.

FIGS. 9A-9B are schematic diagrams illustrating a resource allocation indication result in another case according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
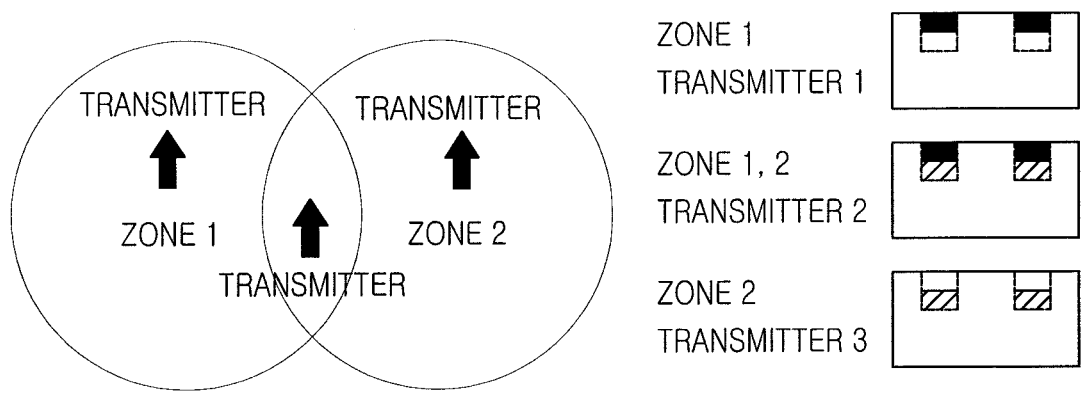
FIG. 1 is a schematic diagram illustrating a distribution of multiple serving zones and an allocation of transmission resources according to the related art.
Figure 2:
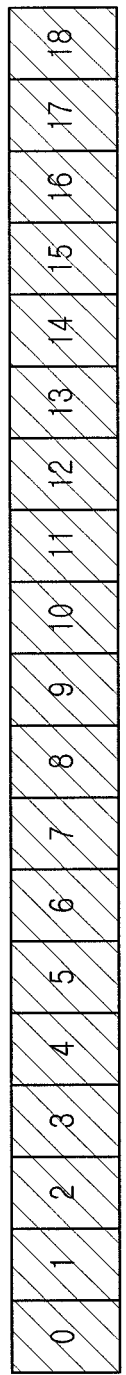
FIG. 2 is a schematic diagram illustrating a resource allocation of multiple serving zones according to the related art.
Figure 2:
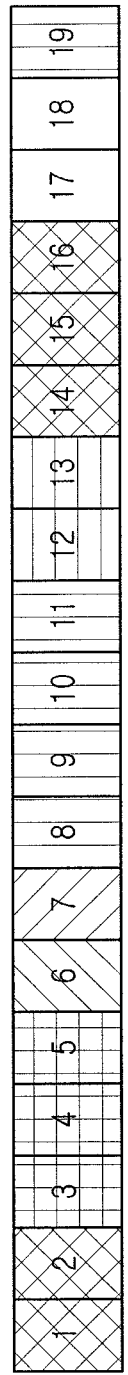

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As described in the above, when a transmitter for providing services in an information transmission system (e.g., a BS), belongs to multiple serving zones to provide services of the multiple serving zones, an indication as to which resource units are occupied by the multiple serving zones is needed so that a receiver (e.g., an MS), can learn the number of serving zones, can determine that a service provided by each resource unit is a service provided by which serving zone, and can perform corresponding processing. In addition, when the transmitter can also provide other types of services, an indication as to service types provided by each resource unit is needed so that the receiver can learn the service types provided by each resource unit and can perform corresponding processing. An example in which one BS belongs to multiple E-MBS zones at the same time in an IEEE 802.16 communication system is shown in FIG. 1.

In order to satisfy at least the above-identified the requirements of a communication system, exemplary embodiments of the present invention provide a method for indicating the allocation of multiple resource units between multiple serving zones. In the method, each resource unit is mapped to one bit, and information about service types provided by each serving zone is obtained by mapping an added virtual resource unit to one bit or by a secondary mapping. Bits to which part of or all of the above resource units are mapped, or bits to which part of or all of the above resource units and the virtual resource unit are mapped, or bits to which part of or all of the above resource units are mapped and bits obtained by the secondary mapping, constitute a resource allocation indication, and the number of serving zones, the start resource unit and end resource unit of each serving zone and the service type of each serving zone can be learned according to the resource allocation indication and a prearrangement between the transmitter and the receiver. In exemplary embodiments of the present invention, the overhead of indication is unrelated to the number of serving zones to be indicated, and obvious advantages can be obtained when the number of serving zones to be indicated changes in a large range and/or the number of serving zones to be indicated is large.

Figure 3:
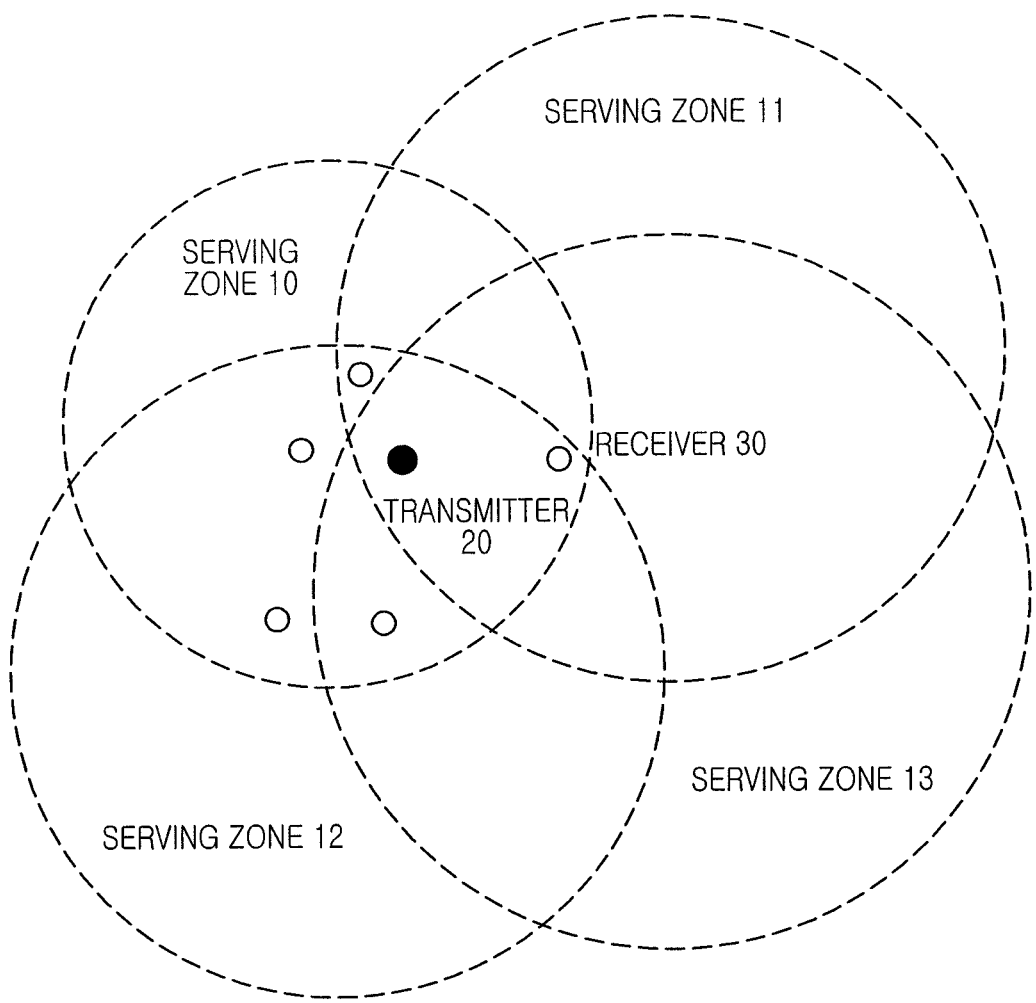
FIGS. 3 and 4 are schematic diagrams illustrating application scenes according to an exemplary embodiment of the present invention.
Figure 4:
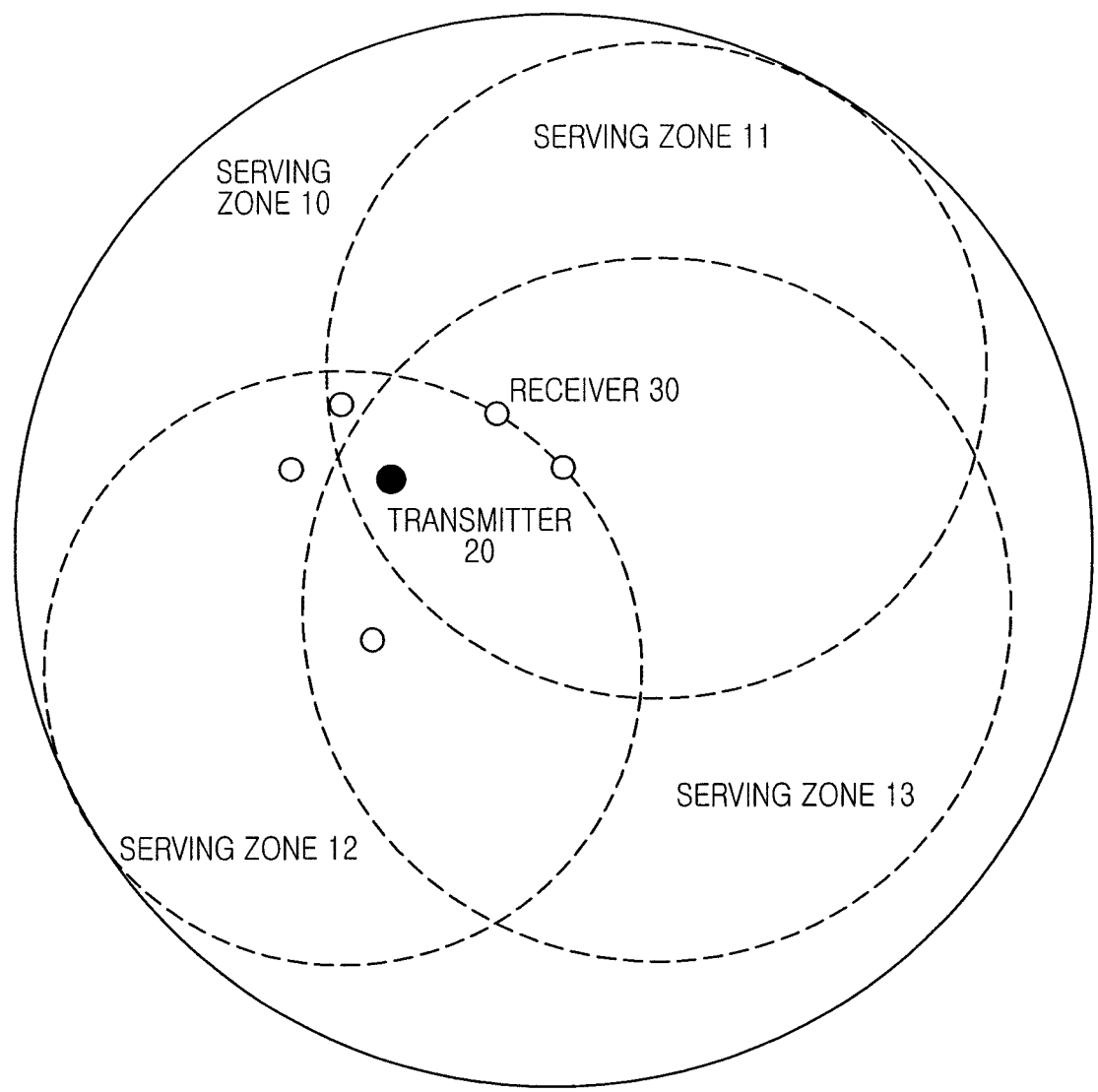

In order to clearly describe exemplary embodiments of the present invention, the scene shown in FIG. 1 may be extended to obtain application scenes shown in FIGS. 3 and 4.

FIGS. 3 and 4 are schematic diagrams illustrating application schemes according to an exemplary embodiment of the present invention.

Referring to FIGS. 3 and 4, in a communication system, a transmitter 20 belongs to M serving zones and provides services of the serving zones to one or more receivers 30, where M is an integer equal to or larger than 1 (e.g., 4 serving zones 10-13) shown in FIGS. 3 and 4. FIG. 4 shows an example that a unicast zone (e.g., denoted by a circle having a solid line) has the largest coverage scope in an IEEE 802.16 communication system. The application scene is familiar to those skilled in the art, and any proper application scene may be imagined by those skilled in the art. Generally, in one system, resources which can be allocated to multiple serving zones are finite, or the finite resources need to be used repeatedly. Usually, multiple resource units in the range of the finite resources can be considered. For example, one resource unit may be any resource allocation unit applicable to the application scene, such as the smallest resource allocation unit, a resource transmission sub-block, a resource transmission time-frequency block, a time-domain transmission symbol, a subframe and sub-frequency band. For example, N resource units may be considered, where N is an integer equal to or larger than M. In exemplary embodiments of the present invention, 21 resource units may be considered (i.e., N is equal to 21), and one or more of the 21 resource units are allocated to the serving zones 10-13 (i.e., M is equal to 4). Exemplary embodiments of the present invention are not limited to the 21 resource units. Generally, multiple serving zones may provide the same type of services or different types of services. In exemplary embodiments of the present invention, mainly concerning IEEE 802.16 communication systems, the transmitter 20 may be a BS, and the receiver 30 may be an MS, or vice versa; the serving zones 10-13 may provide one or more service types such as, for example, unicast, multicast, broadcast, location, relay or self-organizing network service, etc. It should be noted that, the idea of exemplary embodiments of the present invention should not be limited to this, but may be applied to other types of communication systems, other types of transmitters and receivers and other types of services. Hereinafter, a description of exemplary embodiments of the present invention assumes that the BS is a transmitter, and the MS is a receiver.

Figure 5:
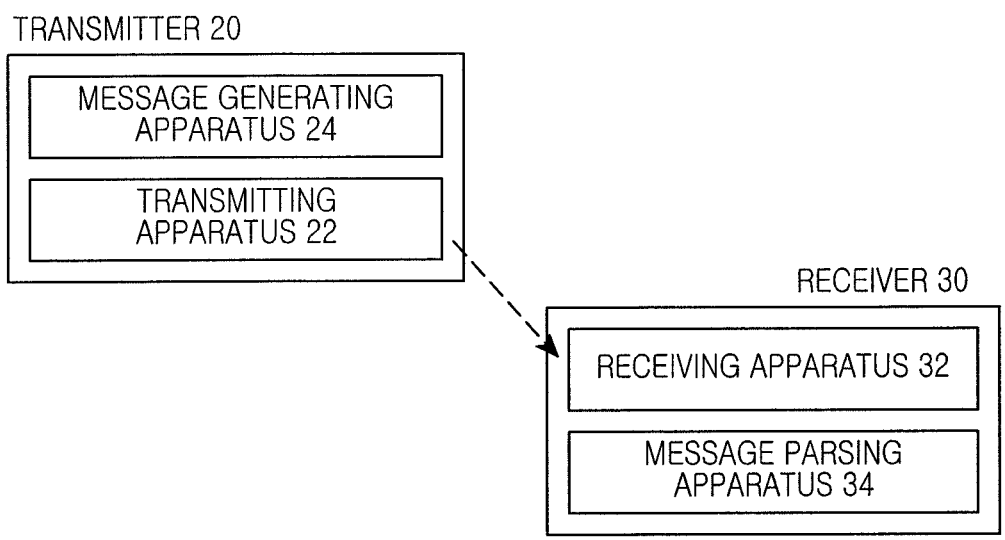
FIG. 5 is a block diagram of a transmitter and a receiver according to an exemplary embodiment of the present invention.

FIG. 5 is a block diagram of a transmitter and a receiver according to an exemplary embodiment of the present invention.

Referring to the application scenes shown in FIGS. 3 and 4, and referring to the block diagram shown in FIG. 5, the BS 20 includes a transmitting apparatus 22, adapted to transmit services provided by the serving zones 10-13 to the MS 30 by using the above 21 resource units. In order to indicate the allocation of the 21 resource units between the serving zones 10-13 so that the MS 30 can learn the allocation of the 21 resource units and perform corresponding processing, the BS 20 further includes a generating apparatus 24 of resource allocation indication message, adapted to generate a resource allocation indication message. The BS 20 transmits the resource allocation indication message to the MS 30 through the transmitting apparatus 22 during other transmission processes of the system by taking the resource allocation indication message as part of or all of signaling, or part of or all of data to be transmitted. When the resource allocation indication message is taken as part of the data to be transmitted, the resource allocation indication message is usually taken as the start part of the data. For example, other transmission processes may include one or more of repeating, encoding, puncturing, symbol modulating (e.g., QPSK, 16QAM etc.), symbol mapping, pilot signal inserting, OFDM symbol Cyclic Prefix (CP) inserting and radio frequency transmitting.

Correspondingly, referring to FIG. 5, the MS 30 as the receiver includes a receiving apparatus 32, adapted to receive the services and the resource allocation indication message transmitted by the BS 20. In addition, the MS 30 further includes a parsing apparatus 34 of resource allocation indication message, adapted to parse the resource allocation indication message received from the BS 20, to learn the allocation of the 21 resource units between the serving zones 10-13 and perform corresponding processing.

FIGS. 6A-6C and 7A-7B are schematic diagrams illustrating a resource allocation indication result in a case according to an exemplary embodiment of the present invention.

Referring to FIGS. 3-5 and 6A-9B, a process that the generating apparatus 24 of resource allocation indication message in the embodiment of the present invention generates the resource allocation indication message will be described hereinafter in detail. During the description, details and functions unnecessary for exemplary embodiments of the present invention are omitted to prevent causing confusion of the understanding of exemplary embodiments of the present invention.

For purposes of convenience in describing the mapping processing performed by the generating apparatus 24 of resource allocation indication message for the 21 resource units, the 21 resource units to be allocated to the assumed serving zones 10-13 are numbered herein. For example, the numbers are logical numbers starting from 1 and increasing progressively by 1 (i.e., the numbers are 1, 2, 3, . . . , N, where N is the largest logical number), as shown in FIGS. 6A-9B. It should be noted that because the numbers are logical numbers, resource units with adjacent logical numbers may be adjacent physically or may be nonadjacent physically; similarly, resource units with nonadjacent logical numbers may be adjacent physically or may be nonadjacent physically. In addition, each of the serving zones 10-13 provides a first-type service, or the first-type service and at least one kind of second-type services by using the allocated resource units. For example, a second-type of service may be a unicast service, a multicast service, a broadcast service, a location based service, a relay service, a self-organizing network service, or the like. According to exemplary embodiments of the present invention, the first-type service may be attended, for example, one kind of the above services, and the other types of services are taken as the at least one kind of second-type services. Each type of services above may be differentiated. Those skilled in the art may select a solution according to requirements based on the idea of exemplary embodiments of the present invention.

In exemplary embodiments of the present invention, because the first-type service needs to be attended, according to the service type provided by each serving zone and the location of resource units occupied by each serving zone, there are three cases.

A first case: the serving zones 10-13 all provide the first-type service, (e.g., a multicast service).

A second case: the serving zones 10-13 provide the first-type service and at least one kind of second-type services, and those serving zones which are located in the start location and/or end location of the numbered resource units may provide one or more of at least one kind of second-type services (e.g. a unicast service, and/or a broadcast service, and/or a location based service).

A third case: the serving zones 10-13 provide the first-type service and at least one kind of second-type services, and one or more serving zones among the serving zones 10-13 provide at least one kind of second-type services (e.g. a unicast service, and/or a broadcast service, and/or a location based service).

The generating apparatus 24 of resource allocation indication message adopts different processing in different cases. It should be noted that in exemplary embodiments of the present invention, the processing in the second case is applicable to the first case, the processing in the third case is applicable to the first and second cases, and those skilled in the art can select different processing according to actual requirements or applications.

FIGS. 6A-6C and 7A-7B is a schematic diagram illustrating a resource allocation indication result generated at the BS 20 by the generating apparatus 24 of resource allocation indication message in the first case according to an exemplary embodiment of the present invention. As an example, the serving zones 10-13 all provide a multicast service, and the BS 20 transmits the multicast service by using all resource units 1-21.

The generating apparatus 24 of resource allocation indication message maps each of all or part of the resource units 1-21 to a resource mapping identity represented by one bit, and generates a resource allocation indication message by using all or part of resource mapping identities of resource units allocated to the first M−1 serving zones 10-12 (i.e., 3 serving zones) and the last M−1 serving zones 13-11 (i.e., 3 serving zones).

As an alternative scheme, if it is needed to indicate the service type provided by the serving zone, the resource allocation indication message may be generated by using all or part of resource mapping identities of resource units allocated to the first M−1 serving zones 10-12 (i.e., 3 serving zones) and the last M−1 serving zones 13-11 (i.e., 3 serving zones) and one or more type indication bits for indicating the service types provided by the serving zones 10-13.

When performing the mapping of resource units, because the numbers are logical numbers, the generating apparatus 24 of resource allocation indication message may generally start to perform mapping from the resource unit 1 or the resource unit 21 according to the embodiment of the present invention. According to the exemplary embodiment of the present invention, four mapping schemes are provided.

A first mapping scheme: if a resource unit to be mapped currently and the previously mapped resource unit belong to the same serving zone, the resource unit to be mapped currently is mapped to one of resource mapping identities 1 and 0, where the value of one of resource mapping identities 1 and 0 is different from a reference value; if a resource unit to be mapped currently and the previously mapped resource unit do not belong to the same serving zone, the resource unit to be mapped currently is mapped to the other one of resource mapping identities 1 and 0, where the value of the other one of resource mapping identities 1 and 0 is identical to the reference value.

A second mapping scheme: if a resource unit to be mapped currently and the previously mapped resource unit belong to the same serving zone, the resource unit to be mapped currently is mapped to one of resource mapping identities 1 and 0, where the value of one of resource mapping identities 1 and 0 is identical to the reference value; if a resource unit to be mapped currently and the previously mapped resource units do not belong to the same serving zone, the resource unit to be mapped currently is mapped to the other one of resource mapping identities 1 and 0, where the value of the other one of resource mapping identities 1 and 0 is different from the reference value.

A third scheme: if a resource unit to be mapped currently and the next resource unit to be mapped belong to the same serving zone, the resource unit to be mapped currently is mapped to one of resource mapping identities 1 and 0, where the value of one of resource mapping identities 1 and 0 is different from the reference value; if a resource unit to be mapped currently and the next resource unit to be mapped do not belong to the same serving zone, the resource unit to be mapped currently is mapped to the other one of resource mapping identities 1 and 0, where the value of the other one of resource mapping identities 1 and 0 is identical to the reference value.

A fourth scheme: if a resource unit to be mapped currently and the next resource unit to be mapped belong to the same serving zone, the resource unit to be mapped currently is mapped to one of resource mapping identities 1 and 0, where the value of one of resource mapping identities 1 and 0 is identical to the reference value; if a resource unit to be mapped currently and the next resource unit to be mapped do not belong to the same serving zone, the resource unit to be mapped currently is mapped to the other one of resource mapping identities 1 and 0, where the value of the other one of resource mapping identities 1 and 0 is different from the reference value.

The reference value in the above mapping schemes may be various, and is not unchangeable. The reference value may be a fixed value (e.g., a value prearranged between the transmitter and the receiver). The prearranged value may be a value of a resource mapping identity of a resource unit from which the mapping starts, or a value of a certain location configured by the system (e.g., a value of a certain bit in the identity of the receiver configured by the system or a certain value in system signaling known by both the transmitter and the receiver). The reference value may be changeable (e.g., may be a value of the resource mapping identity of a previously mapped resource unit before the resource unit to be mapped currently).

It should be noted that those skilled in the art can understand the above mapping schemes and can obtain corresponding re-mapping/parsing schemes. Thus, a detailed description of the re-mapping/parsing schemes is omitted herein.

FIG. 6A shows resource mapping identities obtained by using the first mapping scheme, and the value of a resource mapping identity of a prearranged resource unit from which the mapping starts is taken as the reference value.

First, the generating apparatus 24 of resource allocation indication message determines whether a resource unit i (e.g., $1 \le i \le 21$) to be mapped currently is an initial resource unit from which the mapping starts (i.e., whether the resource unit i is the resource unit 1 or 21). If the resource unit i to be mapped currently is an initial resource unit from which the mapping starts, then the generating apparatus 24 of resource allocation indication message maps the resource unit i to one of bit 1 and bit 0 according to prearrangement, and one of bit 1 and bit 0 is taken as a resource mapping identity of the resource unit i. If the resource unit i to be mapped currently is not an initial resource unit from which the mapping starts, the generating apparatus 24 of resource allocation indication message determines whether a resource unit i and the previously mapped resource unit i−1 or i+1 belong to the same serving zone, and maps the resource unit i according to the determining result. As shown in FIG. 6A, the generating apparatus 24 of resource allocation indication message performs mapping from the resource unit 21 according to the first mapping scheme.

In the first step, the generating apparatus 24 of resource allocation indication message determines whether the current resource unit i is the initial resource unit 21 from which the mapping starts. If the current resource unit i is the initial resource unit 21 from which the mapping starts, the generating apparatus 24 of resource allocation indication message maps the initial resource unit 21 to bit 1 (e.g., the value of the resource mapping identity of the initial resource unit from which the mapping starts is prearranged), and performs the third step. Otherwise, if the current resource unit i is not the initial resource unit 21 from which the mapping starts, the generating apparatus 24 performs the second step.

In the second step, the generating apparatus 24 of resource allocation indication message determines whether the current resource unit i and the previously mapped resource i−1 or i+1 belong to the same serving zone. If the current resource unit i and the previously mapped resource i−1 or i+1 belong to the same serving zone, the generating apparatus 24 of resource allocation indication message maps the resource unit i to bit 0. Otherwise, if the current resource unit i and the previously mapped resource i−1 or i+1 do not belong to the same serving zone, the generating apparatus 24 maps the resource unit i to bit 1.

In the third step, the generating apparatus 24 of resource allocation indication message subtracts 1 from i, and repeats the second and third steps until i=0.

For example, the resource unit 20 and the previously mapped resource unit 21 shown in FIG. 6A do not belong to the same serving zone, and thus the resource unit 20 is mapped to bit 1; the resource unit 19 and the previously mapped resource unit 20 belong to the same serving zone, and thus the resource unit 19 is mapped to bit 0. And thus, resource mapping identities composed of bit 0 and bit 1 are generated. As an example, because the value of the resource mapping identity of the initial resource unit from which the mapping starts is prearranged and the value is a fixed value, the resource mapping identity of the initial resource unit may not be transmitted. It should be noted that bit 1 and bit 0 may be interchangeable during the above process.

After the resource mapping identities of the resource units 1-21 are generated, the generating apparatus 24 of resource allocation indication message generates a resource allocation indication message by using the resource mapping identities of the first N−1 resource units (i.e., 20 resource units from 20 to 1). As an alternative scheme, if it is needed to indicate service types, a type indication bit may be adopted, whose meanings may be prearranged between the transmitter and the receiver (e.g., 1 represents the first-type service, such as a multicast service, and 0 represents a second-type service, such as a unicast service).

As an alternative scheme, the type indication bit may not be adopted, but prearrangement between the transmitter and the receiver is adopted. If the resource mapping identity of the initial resource unit (e.g., the resource mapping identity of the initial resource unit 21) is 1, then the resource units transmit the first-type service. In contrast, if the resource mapping identity of the initial resource unit is 0, then the resource units transmit at least one kind of second-type services, or vice versa. At this time, the resource mapping identity of the initial resource unit 21 needs to be transmitted.

In the first mapping scheme performed above, the number of resource mapping identities whose values are identical to the reference value may be used to calculate the number of serving zones (e.g., the number of serving zones is equal to the number of resource mapping identities whose values are 1 or 0, or equal to the number plus 1). Resource units corresponding to the resource mapping identities whose values are identical to the reference value indicate the start point of a corresponding serving zone, the former resource unit (i.e., the previously mapped resource unit), indicates the end point of the former serving zone. As shown in FIG. 6A, bit 1 is used to indicate the start point of a serving zone, the number of bits 1 is 3, and thus it is indicated that the number of serving zones is 3+1=4. In addition, except the start point of the first serving zone which is the initial resource unit 21, each bit 1 indicates the start point of a serving zone, so as to obtain the range and the number of resource units occupied by each serving zone.

After receiving the resource allocation indication message from the BS 20, the MS 30 parses the resource allocation indication message through the parsing apparatus 34 of resource allocation indication message, to learn the allocation of the 21 resource units between the serving zones 10-13 and to perform corresponding processing.

Specifically, according to prearrangement, the parsing apparatus 34 of resource allocation indication message may learn whether a resource unit and the next resource unit belong to the same serving zone according to the value of the resource mapping identity of the resource unit in the bit sequence. As shown in FIG. 6A, the resource mapping identity of the resource unit 20 is 1, and is the same as the value 1 of the resource mapping identity of the prearranged initial resource unit; by using a re-mapping scheme corresponding to the first mapping scheme, it can be learned that the resource unit 20 and the initial resource unit do not belong to the same serving zone. By using the re-mapping scheme corresponding to the first mapping scheme, the resource mapping identities whose values are 1 or 0 in the bit sequence may be checked, the number of the resource mapping identities whose values are 1 or 0 is calculated and may be added by 1, and thus the number of serving zones can be learned. It should be understood that in the above alternative scheme, if the resource mapping identity of the initial resource unit is transmitted, by checking the resource mapping identities whose values are 1 or 0 in the bit sequence and by calculating using the number of the resource mapping identities whose values are 1 or 0, the number of the serving zones can be learned. It should be also understood that the parsing apparatus 34 of resource allocation indication message may determine, by checking the resource mapping identities whose values are 1 or 0 in the bit sequence, that a resource unit corresponding to the resource mapping identities indicates the start point of a corresponding serving zone, the former resource unit indicates the end point of the corresponding former serving zone, the remained resource units which cannot correspond to resource mapping identities belong to the same serving zone, in which the serving zone is different from the serving zone to which the resource units which can correspond to resource mapping identities belong.

FIG. 6B shows resource mapping identities obtained by using the third mapping scheme, and the prearranged value of the resource mapping identity of the initial resource unit from which the mapping starts is taken as the reference value. A difference between the third mapping scheme and the first mapping scheme shown in FIG. 6A includes that, in the third mapping scheme, the determination are made from the resource unit to be mapped currently and the next resource unit to be mapped. If the resource unit to be mapped currently and the next resource unit to be mapped belong to the same serving zone, then the resource unit to be mapped currently is mapped to one of resource mapping identities 1 and 0, where the value of one of resource mapping identities 1 and 0 is different from the reference value. In contrast, if the resource unit to be mapped currently and the next resource unit to be mapped do not belong to the same serving zone, the resource unit to be mapped currently is mapped to the other one of resource mapping identities 1 and 0, where the value of the other one of resource mapping identities 1 and 0 is identical to the reference value.

Referring to FIG. 6B, the generating apparatus 24 of resource allocation indication message performs mapping starting from the resource unit 21 according to the third mapping scheme, where the value of the resource mapping identity of the initial resource unit from which the mapping starts is prearranged as 1.

In the first step, the generating apparatus 24 of resource allocation indication message determines whether the current resource unit i and the next resource unit i−1 to be mapped belong to the same serving zone. If the current resource unit i and the next resource unit i−1 to be mapped are determined to belong to the same serving zone, then the generating apparatus 24 of resource allocation indication message maps the current resource unit i to bit 0. Otherwise, if the current resource unit i and the next resource unit i−1 to be mapped are determined not to belong to the same serving zone, then the generating apparatus maps the current resource unit i to bit 1.

In the second step, the generating apparatus 24 of resource allocation indication message subtracts 1 from i, and repeats the first and second steps until i=0.

For example, the resource unit 21 and the resource unit 20 shown in FIG. 6B do not belong to the same serving zone, and thus the resource unit 21 is mapped to bit 1; the resource unit 20 and the resource unit 19 belong to the same serving zone, and thus the resource unit 20 is mapped to bit 0. In this way, resource mapping identities composed of bit 0 and bit 1 are generated. Here, it is needed to determine by the resource unit to be mapped currently and the next resource unit to be mapped (e.g., the determining reflects the relation between the resource unit to be mapped currently and the next resource unit to be mapped), and thus the resource mapping identity of the last resource unit may not be transmitted, and the serving zone to which the last resource unit belongs can be learned according to the former resource unit. It should be noted that bit 1 and bit 0 may be interchangeable during the above process.

After generating the resource mapping identities of the resource units 1-21, the generating apparatus 24 of resource allocation indication message generates the resource allocation indication message by using the resource mapping identities of the last 20 resource units from 2 to 21. As described in the above, as an alternative scheme, if it is needed to indicate service types, the type indication bit may also be adopted.

In the third mapping scheme, the number of resource mapping identities whose values are different from the reference value can be used to calculate the number of serving zones (e.g., the number of serving zones is equal to the number of resource mapping identities whose values are 1 or 0 or equal to the number plus 1). A resource unit corresponding to a resource mapping identity whose value is identical to the reference value indicates the end point of a corresponding serving zone, and the next resource unit to be mapped correspondingly indicates the start point of the next serving zone. As shown in FIG. 6B, bit 0 is used to indicate the end point of a serving zone, the number of bits 0 is 3, and thus it is indicated that there are 3+1=4 serving zones. In addition, except the end point of the last serving zone which is the resource unit 1, each bit 0 indicates the end point of a serving zone, so as to obtain the range and the number of resource units occupied by each serving zone.

After receiving the resource allocation indication message from the BS 20, the MS 30 parses the resource allocation indication message through the parsing apparatus 34 of resource allocation indication message, to learn the allocation of the 21 resource units between the serving zones 10-13 and perform corresponding processing. The processing may refer to the embodiment shown in FIG. 6A.

FIG. 6C shows resource mapping identities obtained by using the first mapping scheme, and a value of the resource mapping identity of a previously mapped resource unit is taken as the reference value. As shown in FIG. 6C, the generating apparatus 24 of resource allocation indication message performs mapping starting from the resource unit 1 according to the first mapping scheme.

In the first step, the generating apparatus 24 of resource allocation indication message determines whether the current resource unit i is the initial resource unit 1. If the current resource unit i is determined to be the initial resource unit 1, then the generating apparatus 24 of resource allocation indication message maps the initial resource unit 1 to bit 1 or bit 0, and performs the third step; otherwise, performs the second step.

In the second step, the generating apparatus 24 of resource allocation indication message determines whether a current resource unit i and the previously mapped resource unit i−1 belong to the same serving zone. If the current resource unit and the previously mapped resource unit i−1 are determined to be the same serving zone, then the generating apparatus 24 of resource allocation indication message maps the resource unit i to a bit different from the value of the resource mapping identity of the previously mapped resource unit i−1 (i.e., bit 0 or bit 1). If the current resource unit i and the previously mapped resource unit i−1 are determined to not be the same serving zone, then the generating apparatus 24 of resource allocation indication message maps the resource unit i to a bit identical to the value of the resource mapping identity of the previously mapped resource unit i−1 (i.e., bit 1 or bit 0).

In the third step, the generating apparatus 24 of resource allocation indication message adds 1 to i, and repeats the second and third steps until i=21.

For example, as shown in FIG. 6C, the initial resource unit 1 is mapped to bit 0, the resource unit 2 and the resource unit 1 do not belong to the same serving zone, and thus referring to the bit to which the resource unit 1 is mapped, the resource unit 2 is mapped to bit 0 identical to the bit to which the resource unit 1 is mapped; the resource unit 3 and the resource unit 2 belong to the same serving zone, and thus the resource unit 3 is mapped to bit 1 different from the bit to which the resource unit 2 is mapped. And thus, resource mapping identities composed of bit 0 and bit 1 are generated. It should be noted that bit 1 and bit 0 may be interchangeable during the above process.

After the resource mapping identities of the resource units 1-21 are generated, the generating apparatus 24 of resource allocation indication message generates a resource allocation indication message by using the resource mapping identities of the resource units 2-21.

In the first mapping scheme, the number of serving zones can be calculated according to the prearrangement of the initial resource unit and the number of times that adjacent resource mapping identities keep the same, and resource units corresponding to the adjacent resource mapping identities which keep the same respectively indicate the start points and end points of corresponding two serving zones. As shown in FIG. 6C, the number of times that the adjacent resource mapping identities keep the same is 2, which indicates that there are 2+2=4 serving zones. In addition, the resource units corresponding to the adjacent resource mapping identities which keep the same respectively indicate the end points and start points of corresponding two serving zones (e.g., the resource unit 12 indicates the end point of the serving zone 11, and the resource unit 13 indicates the start point of the serving zone 12).

After receiving the resource allocation indication message from the BS 20, the MS 30 parses the resource allocation indication message through the parsing apparatus 34 of resource allocation indication message, to learn the allocation of the 21 resource units between the serving zones 10-13 and perform corresponding processing.

Specifically, the parsing apparatus 34 of resource allocation indication message may learn, according to the prearrangement for the value of the resource mapping identity of the initial resource unit, the number of serving zones by checking and calculating the number of times that adjacent resource mapping identities keep the same in the bit sequence, and adding 2 to the number. In addition, by checking the location at which the adjacent resource mapping identities keep the same in the bit sequence, the parsing apparatus 34 of resource allocation indication message may determine that the resource units at this location respectively indicate the end points and start points of corresponding two serving zones.

Figure 7A:
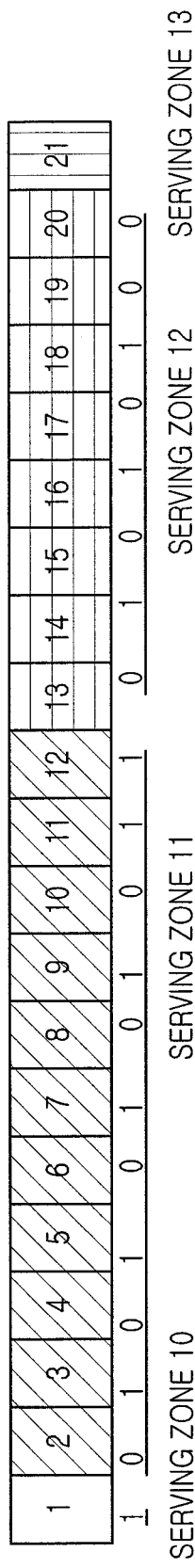

FIG. 7A shows resource mapping identities obtained by using the third mapping scheme, and the value of the resource mapping identity of the previously mapped resource unit is taken as the reference value. A difference between the third mapping scheme and the first mapping scheme shown in FIG. 6C includes that, in the third mapping scheme the resource unit to be mapped currently and the next resource unit to be mapped are determined. If the resource unit to be mapped currently and the next resource unit to be mapped belong to the same serving zone, then the resource unit to be mapped currently is mapped to one of resource mapping identities 1 and 0, where the value of one of resource mapping identities 1 and 0 is different from the reference value. In contrast, if the resource unit to be mapped currently and the next resource unit to be mapped do not belong to the same serving zone, then the resource unit to be mapped currently is mapped to the other one of resource mapping identities 1 and 0, where the value of the other one of resource mapping identities 1 and 0 is identical to the reference value. As shown in FIG. 7A, the generating apparatus 24 of resource allocation indication message prearranges, starting from the resource unit 1, that the value of the resource mapping identity of a previously mapped resource unit of the initial resource unit as bit 1.

And then, the mapping is performed according to the third mapping scheme.

In the first step, the generating apparatus 24 of resource allocation indication message determines whether the current resource unit i and the next resource unit i+1 to be mapped belong to the same serving zone. If the current resource unit i and the next resource unit i+1 to be mapped are determined to belong to the same serving zone, then the generating apparatus 24 of resource allocation indication message maps the current resource unit i to a bit different from the value of the resource mapping identity of the previous resource unit i−1 (i.e., bit 0 or bit 1). Otherwise, if the current resource unit i and the next resource unit i+1 to be mapped are determined to belong to the same serving zone, then the generating apparatus 24 maps the current resource unit i to a bit identical to the value of the resource mapping identity of the previous resource unit i−1 (i.e., bit 1 or bit 0).

In the second step, the generating apparatus 24 of resource allocation indication message adds 1 to i, and repeats the first and second steps until i=20.

For example, the resource unit 2 and the resource unit 3 shown in FIG. 7A belong to the same serving zone, and thus referring to the bit to which the resource unit 1 is mapped, the resource unit 2 is mapped to bit 0 different from bit 1 to which the resource unit 1 is mapped; the resource unit 3 and the resource unit 4 belong to the same serving zone, and thus the resource unit 3 is mapped to bit 1 different from bit 0 to which the resource unit 2 is mapped. In this way, resource mapping identities composed of bit 0 and bit 1 are generated. It should be noted that bit 1 and bit 0 may be interchangeable during the above process.

After generating the resource mapping identities of the resource units 1-20, the generating apparatus 24 of resource allocation indication message performs the same processing as shown in FIG. 6C, which will not be described in detail.

In the third mapping scheme, the number of serving zones can be calculated according to the prearrangement for the value of the resource mapping identity of the previously mapped resource unit of the initial resource unit and the number of times that adjacent resource mapping identities keep the same, and resource units whose numbers are equal to the numbers of the resource units corresponding to the adjacent resource mapping identities which keep the same plus 1 respectively indicate the end points and start points of corresponding two serving zones. As shown in FIG. 7A, the number of times that the adjacent resource mapping identities keep the same is 2, which indicates that there are 2+2=4 serving zones. In addition, the resource units whose numbers are equal to the numbers of the resource units corresponding to the adjacent resource mapping identities which keep the same plus 1 respectively indicate the start points and end points of corresponding two serving zones. For example, the resource unit 12, whose number is equal to 11 plus 1, indicates the end point of the serving zone 11, and the resource unit 13, whose number is equal to 12 plus 1, indicates the start point of the serving zone 12.

After receiving the resource allocation indication message from the BS 20, the MS 30 parses the resource allocation indication message through the parsing apparatus 34 of resource allocation indication message, to learn the allocation of the 21 resource units between the serving zones 10-13 and to perform corresponding processing. The processing may refer to the embodiment shown in FIG. 6C.

Figure 7B:
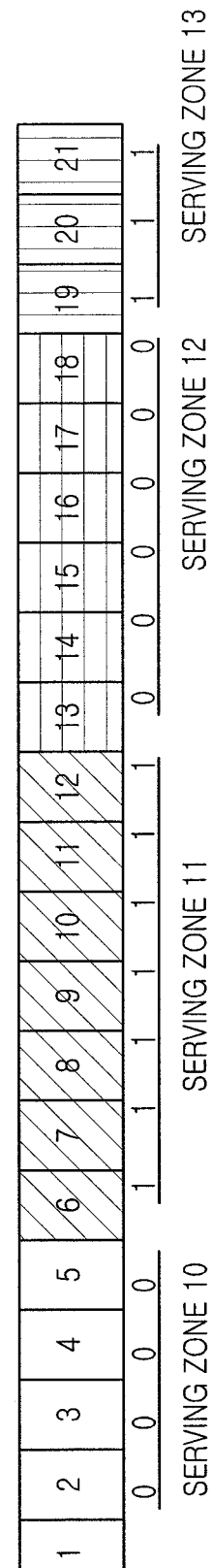

FIG. 7B shows resource mapping identities obtained by using the second mapping scheme, and a value of the resource mapping identity of a previously mapped resource unit is taken as the reference value. As shown in FIG. 7B, the generating apparatus 24 of resource allocation indication message performs mapping starting from the resource unit 1 according to the second mapping scheme.

In the first step, the generating apparatus 24 of resource allocation indication message determines whether the current resource unit i is the initial resource unit 1. If the current resource unit i is determined to be the initial resource unit 1, then the generating apparatus 24 of resource allocation indication message maps the initial resource unit 1 to bit 1 or bit 0 according to the prearrangement, and performs the third step. Otherwise, if the current resource unit i is determined to not be the initial resource unit 1, then the generating apparatus 24 performs the second step.

In the second step, the generating apparatus 24 of resource allocation indication message determines whether a current resource unit i and the previously mapped resource unit i−1 belong to the same serving zone. If the current resource unit and the previously mapped resource unit i−1 are determined to belong to the same serving zone, then the generating apparatus 24 of resource allocation indication message maps the current resource unit i to a bit identical to a value of the resource mapping identity of the previously mapped resource unit i−1 or a prearranged value (i.e., bit 0 or bit 1). Otherwise, if the current resource unit i and the previously mapped resource unit i−1 are determined to not belong to the same serving zone, then the generating apparatus 24 of resource allocation indication message maps the current resource unit i to a bit different from a value of the resource mapping identity of a previously mapped resource unit i−1 or the prearranged value (i.e., bit 1 or bit 0).

In the third step, the generating apparatus 24 of resource allocation indication message adds 1 to i, and repeats the second and third steps until i=21.

For example, as shown in FIG. 7B, the initial resource unit 1 is mapped to bit 0, the resource unit 6 and the previously mapped resource unit 5 do not belong to the same serving zone, and thus the resource unit 6 is mapped to bit 1 different from bit 0 to which the resource unit 5 is mapped. The resource unit 7 and the previously mapped resource unit 6 belong to the same serving zone, and thus the resource unit 7 is mapped to bit 1. And thus, resource mapping identities composed of bit 0 and bit 1 are generated. It should be noted that bit 1 and bit 0 may be interchangeable during the above process.

After the resource mapping identities of the resource units 1-21 are generated, the generating apparatus 24 of resource allocation indication message performs the same processing as shown in FIGS. 6C and 7A, which will not be described in detail.

In the second mapping scheme, the number of serving zones can be calculated according to the prearrangement and the number of times that adjacent resource mapping identities change, and resource units corresponding to the adjacent resource mapping identities which change respectively indicate the end points and start points of corresponding two serving zones. As shown in FIG. 7B, the number of times that the adjacent resource mapping identities change is 3, which indicates that there are 3+1=4 serving zones. In addition, the resource units corresponding to the adjacent resource mapping identities which change respectively indicate the end points and start points of corresponding two serving zones (e.g., the resource unit 5 indicates the end point of the serving zone 10, and the resource unit 6 indicates the start point of the serving zone 11).

When receiving the resource allocation indication message from the BS 20, the MS 30 parses the resource allocation indication message through the parsing apparatus 34 of resource allocation indication message, to learn the allocation of the 21 resource units between the serving zones 10-13 and perform corresponding processing.

Specifically, according to exemplary embodiments of the present invention, the parsing apparatus 34 of resource allocation indication message may learn, according to the prearrangement for the value of the resource mapping identity of the initial resource unit in the bit sequence, the number of serving zones by checking and calculating the number of times that the adjacent resource mapping identities change in the bit sequence, and adding 1 or 2 to the number according to the prearrangement. In addition, by checking the location at which the adjacent resource mapping identities change in the bit sequence, the parsing apparatus 34 of resource allocation indication message may determine that the resource units at this location respectively indicate the end points and start points of corresponding two serving zones.

Based on the above description, the mapping process and the re-mapping process can be easily learned when the second mapping scheme is adopted and the prearranged value is taken as the reference value.

Finally, the fourth mapping scheme may be adopted, and a value of the resource mapping identity of a previously mapped resource unit or a prearranged value is taken as a reference value. A difference between the fourth mapping scheme and the second mapping scheme shown in FIG. 7B includes that, in the fourth mapping scheme the resource unit to be mapped currently and the next resource unit to be mapped are determined. If the resource unit to be mapped currently and the next resource unit to be mapped belong to the same serving zone, then the resource unit to be mapped currently is mapped to one of resource mapping identities 1 and 0, where the value of one of resource mapping identities 1 and 0 is identical to the reference value. In contrast, if the resource unit to be mapped currently and the next resource unit to be mapped do not belong to the same serving zone, the resource unit to be mapped currently is mapped to the other one of resource mapping identities 1 and 0, where the value of the other one of resource mapping identities 1 and 0 is different from the reference value. In addition, the resource allocation indication message is generated according to the prearrangement by using the resource mapping identities of the resource units 1-20. After receiving the resource allocation indication message from the BS 20, the MS 30 parses the resource allocation indication message through the parsing apparatus 34 of resource allocation indication message, to learn the allocation of the 21 resource units between the serving zones 10-13 and perform corresponding processing.

Referring to the example shown in FIG. 7B, the generating and parsing process of the resource allocation indication message can be easily learned when the fourth mapping scheme is adopted.

In the method for generating the resource allocation indication message in the first case shown in FIGS. 6A-6C and 7A-7B, the length of the resource allocation indication message is 20 (i.e., N−1, where N is the number of resource units). As an alternative scheme, the resource allocation indication message may be generated by using the resource mapping identities of the resource units allocated to the first M−1 serving zones (i.e., 3 serving zones) or the last M−1 serving zones (i.e., 3 serving zones), so that a resource allocation indication message whose length is uncertain is generated. One field may be configured to indicate the length of the resource allocation indication message, so that the receiver can learn the length of the resource allocation indication message, and can learn that a resource unit which is not mapped belongs to another serving zone according to the prearrangement.

Figures 8A, 8B, 8C:
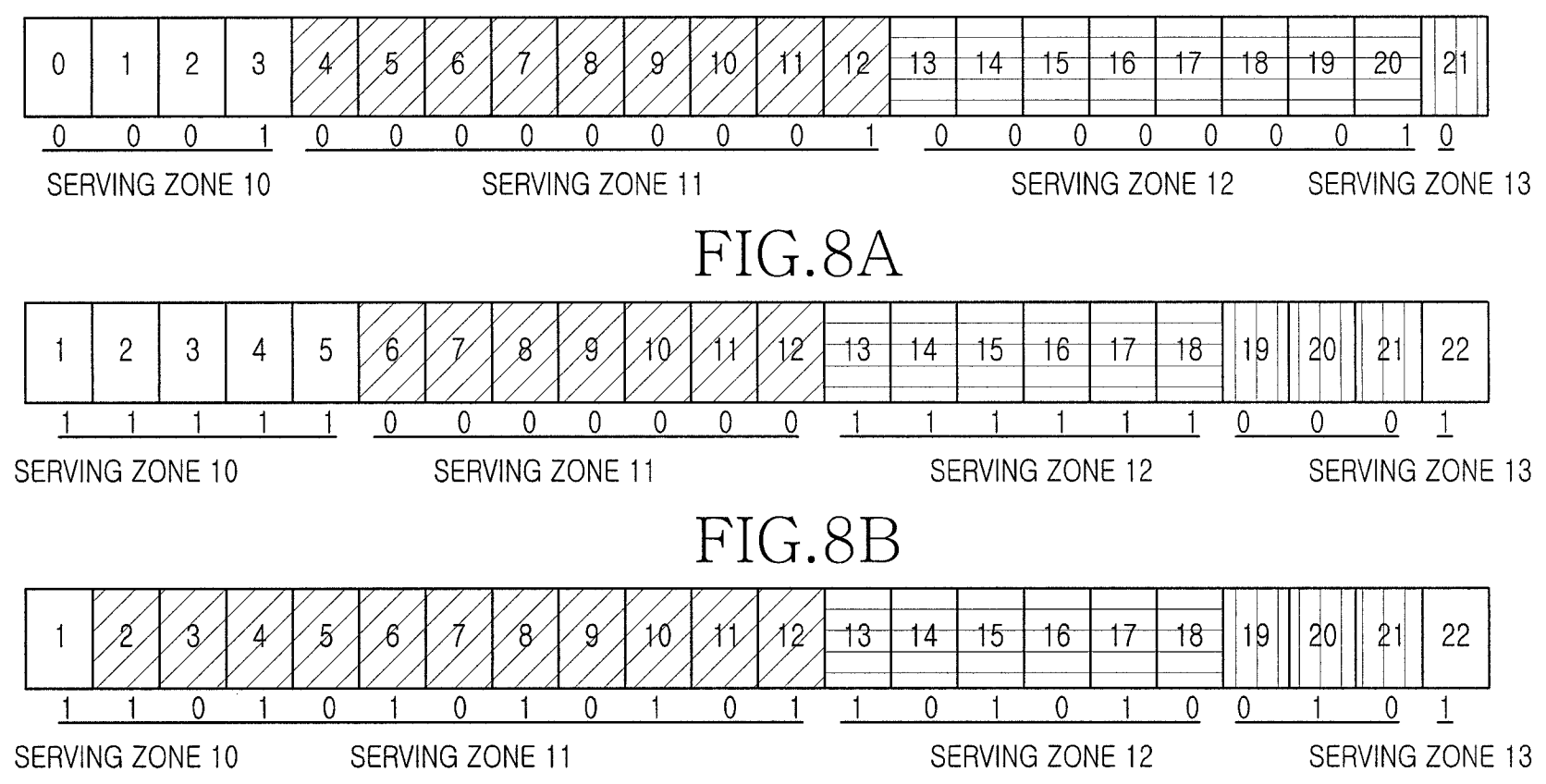

FIGS. 8A-8C are schematic diagrams illustrating a resource allocation indication result in another case according to an exemplary embodiment of the present invention. For example, FIGS. 8A-8C are schematic diagrams illustrating a resource allocation indication result generated at the BS 20 by the generating apparatus 24 of resource allocation indication message in the second case according to an exemplary embodiment of the present invention. As an example, the serving zones 10 and 13 both provide at least one kind of second-type services, such as a unicast service or other types of services, and the serving zones 11 and 12 in the middle both provide the first-type service, such as a multicast service. It should be understood that, it is possible that at most one of the serving zones 10-13 provides such as the unicast service, and other serving zones provide such as the multicast service.

Because the BS 20 could provide the first-type service and at least one kind of second-type services by using the resource units 1-21, it is needed to provide a method for indicating the service type provided by each serving zone. According to the exemplary embodiment of the present invention shown in FIGS. 8A-8C, a virtual resource unit is used to indicate the service type. Here, services except the first-type service may be taken as the second-type services, and thus the second-type services may be various in the following description. Exemplary embodiments of the present invention are not limited to the two types of services.

In the second case, the generating apparatus 24 of resource allocation indication message configures a virtual resource unit 0 and a virtual resource unit 22 respectively before the resource unit 1 and after the resource unit 21, as shown in FIGS. 8A-8C. It may be supposed that the virtual resource unit 0 and the virtual resource unit 22 are both used to transmit the first-type service or the second-type service (e.g., a multicast service or a unicast service). The supposition is prearranged between the transmitter and the receiver, so that the receiver can correctly obtain information about which serving zone provides which type of service.

According to exemplary embodiments of the present invention, when the mapping of resource units is performed, the generating apparatus 24 of resource allocation indication message may perform mapping starting from the virtual resource unit 0 or the virtual resource unit 22. According to the prearrangement, the virtual resource unit 0 or the virtual resource unit 22 is mapped to a resource mapping identity represented by one bit. For example, it can be prearranged that if the virtual resource unit 0 or the virtual resource unit 22 is used to transmit the second-type service (e.g., a unicast service), the virtual resource unit 0 or the virtual resource unit 22 is mapped to bit 0. If the virtual resource unit 0 or the virtual resource unit 22 is used to transmit the first-type service (e.g., a multicast service), then the virtual resource unit 0 or the virtual resource unit 22 is mapped to bit 1, or vice versa. Such an exemplary embodiment of the present invention is satisfactory as long as different types of services can be differentiated by using bit 0 and bit 1.

Afterwards, referring to the resource mapping identity of the virtual resource units 0 or the virtual resource unit 22, the generating apparatus 24 of resource allocation indication message maps each of the resource units and the virtual resource units 22 or 0 to a resource mapping identity represented by one bit according to an ascending order (e.g., from 1 to 21) or a descending order (e.g., from 21 to 1) of numbers of the resource units.

According to the exemplary embodiment of the present invention, if the service type to be provided by the resource units in an edge serving zone (e.g., the first or the fourth serving zone) is the same as the service type to be provided by the virtual resource 0 or 22, then the virtual resource unit 0 is taken as belonging to the first serving zone, and the virtual resource unit 22 is taken as belonging to the fourth serving zone. If the service type to be provided by the resource units in the first or the fourth serving zone is different from the service type to be provided by the virtual resource 0 or 22, then the virtual resource unit 0 is taken as belonging to a serving zone different from the first serving zone, and the virtual resource unit 22 is taken as belonging to a serving zone different from the fourth serving zone. For example, the virtual resource units 0 and 22 respectively belong to the serving zones 1 and 4, or belong to different serving zones. On this basis, the generating apparatus 24 of resource allocation indication message determines whether the current resource unit i (e.g., 1≤i≤22) or (e.g., 0≤i≤21) to be mapped (e.g., when a descending order (from 21 to 1) is adopted) and the previously mapped resource unit or the next resource unit to be mapped (i.e., i−1 or i+1), belong to the same serving zone, and perform mapping according to the determining result by adopting one of the above four mapping schemes. The mapping process corresponds to the steps in the four mapping schemes shown in FIGS. 6A-6C and 7A-7B, and will not be described in detail.

Finally, the generating apparatus 24 of resource allocation indication message generates a resource allocation indication message by using the resource mapping identities of the resource units 1-21 and the resource mapping identity of the virtual resource unit 22 or 0. For example, the resource allocation indication message includes all or a part of the resource mapping identities of the resource units 1-21 and the resource mapping identity of the last mapped virtual resource unit.

FIG. 8A shows a resource mapping result obtained by using the second mapping scheme and a prearranged value (e.g., a bit corresponding to the initial resource unit) in the second case. A mapping order starting from the virtual resource unit 22 is adopted, it is supposed that the virtual resource unit 22 is used to provide the second-type service (e.g., a unicast service), and it is prearranged by the system that the virtual resource unit 22 is mapped to bit 0 and the reference value in the mapping scheme is the resource mapping identity of the virtual resource unit from which mapping starts (i.e., bit 0) to which the virtual resource unit 22 is mapped. For example, the serving zone 13 (i.e., resource unit 21), also provides a unicast service, and thus the serving zone 13 is mapped to bit 0. Afterwards, the resource unit 20 and the resource unit 21 do not belong to the same serving zone, and thus the resource unit 20 may be mapped to bit 1, to indicate the start point of a new serving zone. Similarly, the mapping of the subsequent resource units is performed. It is supposed that the last mapped virtual resource unit 0 is used to provide a unicast service, because the serving zone 10 also provides the unicast service, the virtual resource unit 0 may be taken as belonging to the same serving zone as the serving zone 10, and is mapped to bit 0. In this way, the number of bits 1 or the number of bits 1 plus 1 represents the number of serving zones. Because bit 1 and bit 0 may be interchangeable, it can be learned that in the generated resource allocation indication message in FIG. 8A, except the resource mapping identity of the virtual resource unit, the number of resource mapping identities whose values are 1 or 0 can be obtained, and the number plus 1 is the number of serving zones.

After receiving the resource allocation indication message from the BS 20, the MS 30 parses the resource allocation indication message through the parsing apparatus 34 of resource allocation indication message, to learn the allocation of the 21 resource units between the serving zones 10-13 and perform corresponding processing.

Specifically, the parsing apparatus 34 of resource allocation indication message may learn the service type provided by the serving zone to which the resource unit belongs according to the prearranged service type to be provided by the virtual resource unit, the prearranged mapping scheme and the value of the resource mapping identity of the resource units in the bit sequence. At the same time, by checking the resource mapping identities whose values are 1 or 0 in the bit sequence except the bit corresponding to the last mapped virtual resource unit, calculating the number of the resource mapping identities whose values are 1 or 0 and maybe adding 1 to the number, the number of serving zones can be learned. The parsing apparatus 34 of resource allocation indication message may determine, by checking the resource mapping identities whose values are 1 or 0 in the bit sequence, that a resource unit corresponding to each of the above resource mapping identities indicates the start point of a corresponding serving zone, the former resource unit indicates the end point of the corresponding former serving zone. As shown in FIG. 8A, the parsing apparatus 34 of resource allocation indication message obtains by checking that the first bit of the bit sequence in the resource allocation indication message is 0 (corresponding to the resource unit 21), prearranges that the service type to be provided by the virtual resource unit 22 is the second-type (e.g., unicast), and adopts the second mapping scheme, and the reference value is the bit to which the virtual resource unit 22 is mapped. As mentioned in the above, the bit has been prearranged as bit 0 by the system, and thus according to a re-mapping scheme corresponding to the mapping scheme, it can be learned that the service type corresponding to the resource unit 21 is unicast; afterwards, by checking bit 1 corresponding to the resource unit 20, it can be learned that the resource unit 20 is an start resource unit of the new serving zone 12, and the service type provided by the serving zone 12 is the first-type different from the second-type (e.g., multicast), the rest may be deduced by analogy. When obtaining by checking that the bit corresponding to the last virtual resource unit is 0, it can be learned that the serving zone to which the last virtual resource unit belongs is the same as the serving zone 10 to which the resource units 1-3 belong, and the last mapped virtual resource unit 0 is used to provide a unicast service as prearranged, thus the serving zone 10 provides the unicast service.

FIG. 8B shows a resource mapping result obtained by using the second mapping scheme and taking the resource mapping identity of a previously mapped resource unit as the reference value in the second case. A mapping order starting from the virtual resource unit 0 is adopted, and it is supposed that the virtual resource unit 0 is used to provide the second-type service (e.g., a unicast service), and is mapped to bit 1. For example, the serving zone 10 also provides a unicast service, and thus the resource units 1-5 are mapped to bit 1; the serving zone 11 provides a multicast service, and thus the corresponding resource units are mapped to bit 0. Similarly, the mapping of the subsequent resource units is performed. It is supposed that the last mapped virtual resource unit 22 is used to provide a unicast service, because the serving zone 13 provides a multicast service, the virtual resource unit 22 is taken as belonging to a serving zone different from the serving zone 13, and is mapped to bit 1. In this way, the number of times that adjacent resource mapping identities change minus the resource mapping identity of the initial resource unit (i.e., the first resource unit 1 after the initial virtual resource unit 0), (i.e., minus 1), represents the number of serving zones providing the first-type service, and resource units corresponding to the adjacent resource mapping identities which change respectively indicate the end points and start points of corresponding two serving zones. As shown in FIG. 8B, the number of times that the adjacent resource mapping identities change is 4, which indicates that there are 4−1=3 serving zones providing the first-type service. In addition, the resource units corresponding to the adjacent resource mapping identities which change respectively indicate the end points and start points of corresponding two serving zones. For example, the resource unit 5 indicates the end point of the serving zone 10, and the resource unit 6 indicates the start point of the serving zone 11.

After receiving the resource allocation indication message from the BS 20, the MS 30 parses the resource allocation indication message through the parsing apparatus 34 of resource allocation indication message, to learn the allocation of the 21 resource units between the serving zones 10-13 and to perform corresponding processing.

Specifically, the parsing apparatus 34 of resource allocation indication message may learn the service type provided by the serving zone to which the resource unit belongs according to the prearranged value of the resource mapping identity of the resource unit in the bit sequence. At the same time, by checking and calculating the number of times that adjacent resource mapping identities change in the bit sequence except the bit to which the last virtual resource unit is mapped, and adding 1 to the number, the number of serving zones can be learned. In addition, when the service type provided by the serving zone to which each resource unit belongs, the number of serving zones providing the first-type service can be learned according to the number of times that the adjacent resource mapping identities change and the value of the resource mapping identity at a specific location. In addition, the parsing apparatus 34 of resource allocation indication message may determine, by checking the location at which the adjacent resource mapping identities change in the bit sequence, that the resource units at this location respectively indicate the end points and start points of corresponding two serving zones. As shown in the middle of FIG. 8A-8C, the parsing apparatus 34 of resource allocation indication message obtains by checking that the first bit of the bit sequence in the resource allocation indication message is 1 (corresponding to the resource unit 1), prearranges that the service type to be provided by the virtual resource unit is the second-type (e.g., unicast), and the virtual resource unit is mapped to bit 1, and thus according to the re-mapping scheme, it can be learned that the service type corresponding to the resource unit 1 is unicast; afterwards, by checking bit 1 corresponding to the resource unit 2, it can be learned that the serving zone to which the resource unit 2 belongs is the same as the serving zone to which the resource unit 1 belongs (i.e., the serving zone 10), and the service type provided by the serving zone 10 is the second-type, e.g. unicast, the rest may be deduced by analogy. When obtaining by checking that the bit corresponding to the last virtual resource unit 22 is 1, it can be learned that the serving zone to which the last virtual resource unit belongs is different from the serving zone 13 to which the resource units 19-21 belong, and thus the serving zone 13 provides the multicast service.

FIG. 8C shows a resource mapping result obtained by using the first mapping scheme and taking the resource mapping identity of a previously mapped resource unit as the reference value in the second case. A mapping order starting from the virtual resource unit 0 is adopted, and it is supposed that the virtual resource unit 0 is used to provide the first-type service, e.g. a multicast service, and is mapped to bit 1. For example, the serving zone 10 provides a unicast service, and thus the resource unit 1 is mapped to bit 1; the serving zone 11 provides a multicast service, and thus the initial resource units 2 is mapped to bit 1. Similarly, the mapping of the subsequent resource units is performed. It is supposed that the last mapped virtual resource unit 22 is used to provide a multicast service, because the serving zone 13 provides a multicast service, the virtual resource unit 22 is taken as belonging to the same serving zone as the serving zone 13, and is mapped to bit 1. In this way, except the bit to which the last virtual resource unit is mapped, the number of times that adjacent resource mapping identities keep the same plus 1 represents the number of serving zones, and the resource units corresponding to the adjacent resource mapping identities which keep the same respectively indicate the end points and start points of corresponding two serving zones. As shown in FIG. 8C, the number of times that the adjacent resource mapping identities keep the same is 3, which indicates that there are 3+1=4 serving zones. At the same time, if only the number of serving zones providing the first-type service is considered, the number of serving zones providing the first-type service can be calculated by calculating the number of times that the adjacent resource mapping identities keep the same and according to the prearrangement for the virtual resource units. For example, in FIG. 8C, the number of times that the adjacent resource mapping identities keep the same is the number of serving zones providing the first-type service. In addition, the resource units corresponding to the adjacent resource mapping identities which keep the same respectively indicate the end points and start points of corresponding two serving zones. For example, the resource unit 12 indicates the end point of the serving zone 11, and the resource unit 13 indicates the start point of the serving zone 12.

After receiving the resource allocation indication message from the BS 20, the MS 30 parses the resource allocation indication message through the parsing apparatus 34 of resource allocation indication message, to learn the allocation of the 21 resource units between the serving zones 10-13 and to perform corresponding processing.

Specifically, the parsing apparatus 34 of resource allocation indication message may learn the service type provided by the serving zone to which the resource unit belongs according to the prearrangement and the value of the resource mapping identity of the resource unit in the bit sequence. At the same time, by checking and calculating the number of times that adjacent resource mapping identities keep the same in the bit sequence except the bit to which the last mapped virtual resource unit is mapped, and adding 1 to the number, the number of serving zones can be learned. In addition, the parsing apparatus 34 of resource allocation indication message may determine, by checking the location at which the adjacent resource mapping identities keep the same in the bit sequence, that the resource units at this location respectively indicate the end points and start points of corresponding two serving zones. As shown in FIG. 8C, the parsing apparatus 34 of resource allocation indication message obtains by checking that the first bit of the bit sequence in the resource allocation indication message is 1 (corresponding to the resource unit 1), and prearranges that the service type to be provided by the virtual resource unit is the first-type (e.g., multicast), and is mapped to bit 1, and thus according to the corresponding re-mapping scheme, it can be learned that the service type corresponding to the resource unit 1 is unicast; afterwards, by checking bit 1 corresponding to the resource unit 2, it can be learned that the serving zone to which the resource unit 2 is mapped is different from the serving zone to which the resource unit 1 is mapped, and the service type provided by the serving zone 11 to which the resource unit 2 is mapped is the first-type (e.g., multicast), the rest may be deduced by analogy. When obtaining by checking that the bit corresponding to the last mapped virtual resource unit 22 is 1, it can be learned that the serving zone to which the last mapped virtual resource unit belongs is the same as the serving zone 13 to which the resource units 21 belongs, and thus the serving zone 13 provides the multicast service.

In the second case, if only the first-type service is attended, the number of resource mapping identities whose values are 1 or 0 can be used to calculate the number of serving zones providing the first-type service. For example, when the first or third mapping scheme is adopted and the reference value is a prearranged value, the number of resource mapping identities whose values are identical to the prearranged value in the resource allocation indication message minus 1 may represent the number of serving zones providing the first-type service; when the reference value is a value of the resource mapping identity of a previously mapped resource unit, the number of times that adjacent resource mapping identities in the resource allocation indication message keep the same or change, or the number of times minus 1 may represent the number of serving zones providing the first-type service. When the second or fourth mapping scheme is adopted and the reference value is a prearranged value, the number of resource mapping identities whose values are different from the prearranged value in the resource allocation indication message minus 1 may represent the number of serving zones providing the first-type service; when the reference value is a value of the resource mapping identity of a previously mapped resource unit, the number of times that the adjacent resource mapping identities in the resource allocation indication message change plus the value of the resource mapping identity of the virtual resource unit and may minus the value of the resource mapping identity of the initial resource unit may represent the number of serving zones providing the first-type service.

A detailed process of generating the resource allocation indication message when other mapping schemes and other reference values are adopted is omitted. Based on the above description, those skilled in the art can obtain a case in which other mapping schemes and other reference values are adopted.

FIGS. 9A-9B are schematic diagrams illustrating a resource allocation indication result in another case according to an exemplary embodiment of the present invention. For example, FIGS. 9A-9B are schematic diagrams illustrating a resource allocation indication result generated at the BS 20 by the generating apparatus 24 of resource allocation indication message in the third case according to an exemplary embodiment of the present invention. As an example shown in FIG. 9A, the serving zones 10, 11 and 13 all provide the first-type service, e.g. a multicast service, and the serving zone 12 in the middle provides the second-type service, e.g. a unicast service. It should be understood that it is possible that the serving zone 12 provides the multicast service, and other serving zones provide the unicast service.

Because the BS 20 provides multiple types of services by using the resource units 1-21, it is needed to provide a method for indicating the service type provided by each serving zone. According to the exemplary embodiment of the present invention shown in FIGS. 9A-9B, zone mapping identities may be used to indicate the service type.

The zone mapping may be taken as a secondary mapping. For example, each serving zone may be mapped wholly after each resource unit is mapped. The number of zone mapping identities obtained through the zone mapping represents the number of serving zones, and it can be prearranged that the value of a zone mapping identity represents which service type.

In the third case, the generating apparatus 24 of resource allocation indication message performs mapping for each resource unit according to the first case shown in FIGS. 6A-6C and 7A-7B, and generates the resource mapping identity of each resource unit. The mapping process may be the same as the processes of the four mapping schemes shown in such as FIGS. 6A-6C and 7A-7B, and herein will not be described in detail. FIGS. 9A-9B shows a mapping result obtained by using the first mapping scheme.

Generally, as shown in FIG. 9A, the generating apparatus 24 of resource allocation indication message maps each of the serving zones 10-13 to a zone mapping identity represented by one bit. The generating apparatus 24 of resource allocation indication message determines that the serving zone to be mapped currently is used to provide which one of the first-type service and the second-type service; if the serving zone to be mapped currently is used to provide the first-type service, the generating apparatus 24 of resource allocation indication message maps the serving zone to one of zone mapping identities 1 and 0; if the serving zone to be mapped currently is used to provide the second-type service, the generating apparatus 24 of resource allocation indication message maps the serving zone to the other one of zone mapping identities 1 and 0. For example, it can be prearranged that the first-type service corresponds to 1, and the second-type service corresponds to 0. As shown in FIGS. 9A-9B, the serving zones 10, 11 and 13 provide the first-type service (e.g., a multicast service), and are mapped to bit 1; the serving zone 12 provides the second-type service (e.g., a unicast service), and is mapped to bit 0. Finally, the generating apparatus 24 of resource allocation indication message generates a resource allocation indication message by using all or a part of resource mapping identities of resource units allocated to the serving zones 10-12 (or the resource mapping identities of the resource units 1-20) and zone mapping identities of all serving zones 10-13.

In the third case shown in FIG. 9A, the number of zone mapping identities represents the number of serving zones, and according to the prearrangement, the value of zone mapping identity represents the service type provided by each serving zone. Referring to the first case shown in FIGS. 6A-6C and 7A-7B, when the first mapping scheme and a prearranged value are adopted to perform mapping, if "1" is used to identify an initial resource unit of each serving zone, a resource unit corresponding to a resource mapping identity whose value is 1 indicates a start point of a corresponding serving zone; if "0" is used to identify an start resource unit of each serving zone, a resource unit corresponding to a resource mapping identity whose value is 0 indicates a start point of a corresponding serving zone. When the second mapping scheme is adopted and the resource mapping identity of a previously mapped resource unit is taken as the reference value, resource units corresponding to adjacent resource mapping identities which change respectively indicate the end points and start points of corresponding two serving zones. When the third mapping scheme and a prearranged value are adopted to perform mapping, if "1" is used to identify an end resource unit of each serving zone, a resource unit corresponding to a resource mapping identity whose value is 1 indicates an end point of a corresponding serving zone; if "0" is used to identify an end resource unit of each serving zone, a resource unit corresponding to a resource mapping identity whose value is 0 indicates an end point of a corresponding serving zone. A detailed process of generating the resource allocation indication message when other mapping schemes and other reference values are adopted is omitted. Based on the above description, those skilled in the art can obtain a case in which other mapping schemes and other reference values are adopted.

After receiving the resource allocation indication message from the BS 20, the MS 30 parses the resource allocation indication message through the parsing apparatus 34 of resource allocation indication message, to learn the allocation of the 21 resource units between the serving zones 10-13 and perform corresponding processing.

Specifically, the parsing apparatus 34 of resource allocation indication message can obtain the number of serving zones and the service type provided by each serving zone according to the prearrangement, by checking the number of zone mapping identities and the value of each zone mapping identity. At the same time, for example, by checking the resource mapping identities of resource units allocated to the serving zones 10-12, the parsing apparatus 34 of resource allocation indication message can obtain the start point and end point of resource units occupied by the serving zones 10-12, and learn that the remained resource units belong to the serving zone 13. Or, by checking the resource mapping identities of resource units allocated to the serving zones 10-13, the parsing apparatus 34 of resource allocation indication message can obtain the start point and end point of resource units occupied by the serving zones 10-13.

In addition, if the service types provided in FIGS. 9A-9B are more than 2, the above exemplary embodiments of the present invention can be supported by simply extending. As an example, such a extending may be that: when a zone mapping identity is generated, serving zones providing different service types may be indicated by a corresponding quality of bits, to be differentiated. For example, as shown in FIG. 9B, the serving zone 10 provides the first-type service (e.g., a multicast service), the serving zone 11 provides the second-type service (e.g., a unicast service), the serving zone 12 provides a third-type service (e.g., a location based service), and the serving zone 13 provides a fourth-type service (e.g., a relay service). When it is needed to support the four service types, it may be supposed that 2 bits are used to present a zone mapping identity. For example, the first-type service is represented by "01", the second-type service is represented by "10", the third-type service is represented by "00", and the fourth-type service is represented by "11"; other representing schemes may also be adopted.

After receiving the resource allocation indication message from the BS 20, the MS 30 parses the resource allocation indication message through the parsing apparatus 34 of resource allocation indication message, to learn the allocation of the 21 resource units between the serving zones 10-13 and perform corresponding processing.

Specifically, the parsing apparatus 34 of resource allocation indication message can learn the number of serving zones and the service type provided by each serving zone according to the prearrangement, by checking the number of zone mapping identities and the value of each zone mapping identity. Other processes are the same as shown in FIG. 9A, and will not be described in detail.

It should be noted that in the above exemplary embodiments of the present invention, bit 1 and bit 0 can be interchangeable.

The foregoing is a specific process of generating and parsing the resource allocation indication message according to the exemplary embodiments of the present invention. It should be noted that according to the exemplary embodiments of the present invention, the first case may be taken as a special case in the second or third case (i.e., a case in which there is only one service type). And thus, those skilled in the art can understand that the methods for generating/parsing the resource allocation indication message applied to the second and third cases are also applicable to the first case. Similarly, the second case may be taken as a special case in the third case (i.e., resource units occupied by serving zones providing different service types are located at a start location and/or end location of all resource units). Therefore, those skilled in the art can understand that the methods for generating/parsing the resource allocation indication message applied to the third cases are also applicable to the second case.

In the above description, multiple exemplary embodiments of the present invention are illustrated for each step. Though the above description describes the relation between steps in the exemplary embodiments of the present invention as much as possible, it does not represent that there is a corresponding relation in the exemplary embodiments of the present invention according to reference numbers. As long as there is no conflict under a given condition in the exemplary embodiments of the present invention, exemplary embodiments of the present invention whose reference numbers do not correspond can be selected in different steps to form a technical scheme, and such technical scheme should be covered within the protection scope of the present invention.

It should be noted that in the above description, the technical scheme of the exemplary embodiments of the present invention is shown by taking an example, but it does not represent that the exemplary embodiments of the present invention are limited to the above steps and unit structures. In possible cases, the steps and unit structures may be adjusted and selected according to requirements. And thus, some steps and units are not necessary elements for implementing the exemplary embodiments of the present invention. Therefore, the technical features necessary for the exemplary embodiments of the present invention are only limited to the lowest requirements for implementing the exemplary embodiments of the present invention, but not limited to the embodiments.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for generating a resource allocation indication message, the method comprising:
mapping each of one of N and N−1 resource units to a resource mapping identity; and
transmitting the resource allocation indication message including at least one resource mapping identity,
wherein the resource allocation indication message indicates the allocation of N resource units for M serving zones, wherein the M is an integer equal to or larger than 1,
wherein the N is an integer equal to or larger than M, and
wherein the resource units are mapped according to one of the following mapping schemes:
a first mapping scheme including:
if the resource unit to be mapped currently and the next resource unit to be mapped belong to the same serving zone, mapping the resource unit to be mapped currently to one of resource mapping identity, where the resource mapping identity is different from a reference value, and
if the resource unit to be mapped currently and the next resource unit to be mapped do not belong to the same serving zone, mapping the resource unit to be mapped currently to another resource mapping identity, where the other resource mapping identity is identical to a reference value; and
a second mapping scheme including:
if the resource unit to be mapped currently and the next resource unit to be mapped belong to the same serving zone, mapping the resource unit to be mapped currently to one of resource mapping identity, where the other resource mapping identity is identical to a reference value, and
if the resource unit to be mapped currently and the next resource unit to be mapped do not belong to the same serving zone, mapping the resource unit to be mapped currently to another resource mapping identity, where the other resource mapping identity is different from a reference value.

2. The method of claim 1, further comprising:
if M serving zones provide at least two service types, respectively configuring at least one of a virtual resource unit 0 and a virtual resource unit N+1 for providing at least one service at least one of before the first resource unit and after the Nth resource unit; and
mapping at least one of the virtual resource unit 0 and the virtual resource unit N+1 to a resource mapping identity represented by one bit according to at least one of the service type of the virtual resource unit 0 and the service type of the virtual resource unit N+1;
a value of a resource mapping identity for the one of the first resource unit and the Nth resource unit is determined based on the one bit according to the service type of the virtual resource unit 0 and the service type of the virtual resource unit N+1.

3. A method for generating a resource allocation indication message, the method comprising:
mapping each of the one of N and N−1 resource units to a resource mapping identity;
mapping each of the M serving zones to a zone mapping identity; and
transmitting the resource allocation indication message including at least one resource mapping identities and a zone mapping identity of each serving zone,
wherein the resource allocation indication message indicates the allocation of N resource units numbered for M serving zones,
wherein the M is an integer equal to or larger than 1,
wherein the N is an integer equal to or larger than M, and
wherein the resource units are mapped according to one of the following mapping schemes:
a first mapping scheme including:
if the resource unit to be mapped currently and the next resource unit to be mapped belong to the same serving zone, mapping the resource unit to be mapped currently to one of resource mapping identity, where the resource mapping identity is different from a reference value, and
if the resource unit to be mapped currently and the next resource unit to be mapped do not belong to the same serving zone, mapping the resource unit to be mapped currently to another resource mapping identity, where the other resource mapping identity is identical to a reference value; and
a second mapping scheme including;
if the resource unit to be mapped currently and the next resource unit to be mapped do not belong to the same serving zone, mapping the resource unit to be mapped currently to one of the resource mapping identity, where the resource mapping identity is identical to a reference value, and
if the resource unit to be mapped currently and the next resource unit to be mapped do not belong to the same serving zone, mapping the resource unit to be mapped currently to another resource mapping identity, where the other resource mapping identity is different from a reference value.

4. The method of claim 1, wherein the mapping each of the N resource units to the resource mapping identity comprises:
determining whether a resource unit to be mapped currently is an initial resource unit from which mapping starts;
if the resource unit to be mapped currently is an initial resource unit, mapping the resource unit to a predetermined resource mapping identity;
if the resource unit to be mapped currently is not an initial resource unit, determining whether the resource unit to be mapped currently and the previously mapped resource unit belong to the same serving zone;
performing mapping by adopting one of the first and second mapping schemes according to the determining result.

5. The method of claim 1, wherein the mapping each of the N resource units to the resource mapping identity represented by one bit comprises:
determining whether a resource unit to be mapped currently and the next resource unit to be mapped belong to the same serving zone; and
performing mapping by adopting one of the first and second mapping schemes according to the determining result.

6. The method of claim 4, wherein the reference value comprises one of:
a prearranged value, which corresponds to one of a value of a resource mapping identity of the initial resource unit from which mapping starts, a value of a certain bit in an identity of a receiver configured by a system, and a value in a system signaling known by a transmitter and the receiver; and
a value of the resource mapping identity of a previously mapped resource unit.

7. The method of claim 3, wherein the mapping each of the M serving zones to the zone mapping identity comprises:
mapping each of the M serving zones to a zone mapping identity according to the service type of the resource unit to be mapped currently.

8. The method of claim 1, wherein the resource units corresponding to the at least one resource mapping identities in the resource allocation indication message indicate start points or end points of corresponding serving zones.

9. A method for parsing a resource allocation indication message, the method comprising:

receiving a resource allocation indication message including at least one resource mapping identity; and obtaining a number of serving zones, and a start point and end point of each serving zone according to at least one of the determined at least one resource mapping identity, a prearrangement for a mapping scheme, and a reference value, wherein the resource allocation indication message indicates the allocation of N resource units for M serving zones, wherein the M is an integer equal to or larger than 1, wherein the N is an integer equal to or larger than M, and wherein the mapping scheme comprises one of the following mapping schemes:

a first mapping scheme including:

if the resource unit to be mapped currently and the next resource unit to be mapped belong to the same serving zone, mapping the resource unit to be mapped currently to one of resource mapping identity, where the resource mapping identity is different from a reference value, and if the resource unit to be mapped currently and the next resource unit to be mapped do not belong to the same serving zone, mapping the resource unit to be mapped currently to another resource mapping identity, where the other resource mapping identity is identical to a reference value; and a second mapping scheme including:

if the resource unit to be mapped currently and the next resource unit to be mapped belong to the same serving zone, mapping the resource unit to be mapped currently to one of resource mapping identity, where the other resource mapping identity is identical to a reference value, and if the resource unit to be mapped currently and the next resource unit to be mapped do not belong to the same serving zone, mapping the resource unit to be mapped currently to another resource mapping identity, where the other resource mapping identity is different from a reference value.

10. The method of claim 9, further comprising:

if M serving zones provide at least two service types, obtaining a service type provided by each serving zone according to at least one of the at least one resource mapping identity, the prearrangement for a mapping scheme, the configuration of virtual resource units, and the reference value.

11. A method for parsing a resource allocation indication message, the method comprising:

receiving a resource allocation indication message including at least one resource mapping identity and at least one zone mapping identity; and obtaining a number of serving zones, a start point and end point of each serving zone, and a service type provided by each serving zone according to at least one of the determined at least one resource mapping identity, a determined at least one zone mapping identity, a prearrangement for a mapping scheme, and a reference value, wherein the resource allocation indication message indicates the allocation of N resource units for M serving zones, wherein the M is an integer equal to or larger than 1, wherein the N is an integer equal to or larger than M, and wherein the mapping scheme comprises one of the following mapping schemes:

a first mapping scheme including:

if the resource unit to be mapped currently and the next resource unit to be mapped belong to the same serving zone, mapping the resource unit to be mapped currently to one of resource mapping identity, where the resource mapping identity is different from a reference value, and if the resource unit to be mapped currently and the next resource unit to be mapped do not belong to the same serving zone, mapping the resource unit to be mapped currently to another resource mapping identity, where the other resource mapping identity is identical to a reference value; and a second mapping scheme including:

if the resource unit to be mapped currently and the next resource unit to be mapped belong to the same serving zone, mapping the resource unit to be mapped currently to one of resource mapping identity, where the other resource mapping identity is identical to a reference value, and if the resource unit to be mapped currently and the next resource unit to be mapped do not belong to the same serving zone, mapping the resource unit to be mapped currently to another resource mapping identity, where the other resource mapping identity is different from a reference value.

12. The method of claim 9, wherein the reference value comprises one of:

a prearranged value, which corresponds to one of a value of a resource mapping identity of the initial resource unit from which mapping starts, a value of a certain bit in an identity of a receiver configured by a system, and a value in a system signaling known by a transmitter and the receiver; and a value of the resource mapping identity of a previously mapped resource unit.

13. A transmitter in an information transmission system which is operable to generate a resource allocation indication message to perform all or part of the method of claim 1.

14. A receiver in an information transmission system which is operable to parse a resource allocation indication message to perform all or part of the method of claim 9.

15. The method of claim 2, wherein the mapping each of the N resource units to the resource mapping identity represented by one bit comprises:

determining whether a resource unit to be mapped currently is an initial resource unit from which mapping starts;

if the resource unit to be mapped currently is an initial resource unit, mapping the resource unit to a predetermined resource mapping identity;

if the resource unit to be mapped currently is not an initial resource unit, determining whether the resource unit to be mapped currently and the previously mapped resource unit belong to the same serving zone; and performing mapping by adopting one of the first and second mapping schemes according to the determining result.

16. The method of claim 3, wherein the mapping each of the N resource units to the resource mapping identity represented by one bit comprises:

determining whether a resource unit to be mapped currently is an initial resource unit from which mapping starts;

if the resource unit to be mapped currently is an initial resource unit, mapping the resource unit to a predetermined resource mapping identity;

if the resource unit to be mapped currently is not an initial resource unit, determining whether the resource unit to be mapped currently and the previously mapped resource unit belong to the same serving zone;
performing mapping by adopting one of the first and second mapping schemes according to the determining.

17. The method of claim 2, wherein the mapping each of the N resource units to the resource mapping identity represented by one bit comprises:
determining whether a resource unit to be mapped currently and the next resource unit to be mapped belong to the same serving zone; and
performing mapping by adopting one of the following mapping schemes according to the determining result:
a third mapping scheme including:
if the resource unit to be mapped currently and the next resource unit to be mapped belong to the same serving zone, mapping the resource unit to be mapped currently to one of resource mapping identity, wherein the resource mapping identity is different from a reference value, and
if the resource unit to be mapped currently and the next resource unit to be mapped do not belong to the same serving zone, mapping the resource unit to be mapped currently to another resource mapping identity, wherein the other resource mapping identity is identical to a reference value; and
a fourth mapping scheme including:
if the resource unit to be mapped currently and the next resource unit to be mapped belong to the same serving zone, mapping the resource unit to be mapped currently to one of the resource mapping identity, wherein the resource mapping identity is identical to a reference value, and
if the resource unit to be mapped currently and the next resource unit to be mapped do not belong to the same serving zone, mapping the resource unit to be mapped currently to another resource mapping identity, wherein the other resource mapping identity is different from a reference value.

18. The method of claim 3, wherein the mapping each of the N resource units to the resource mapping identity represented by one bit comprises:
determining whether a resource unit to be mapped currently and a next resource unit to be mapped belong to the same serving zone; and
performing mapping by adopting one of the following mapping schemes according to the determining result:
a third mapping scheme including:
if the resource unit to be mapped currently and the next resource unit to be mapped belong to the same serving zone, mapping the resource unit to be mapped currently to one of resource mapping identity, wherein the resource mapping identity is different from a reference value, and
if the resource unit to be mapped currently and the next resource unit to be mapped do not belong to the same serving zone, mapping the resource unit to be mapped currently to another resource mapping identity, wherein the other resource mapping identity is identical to a reference value; and
a fourth mapping scheme including:
if the resource unit to be mapped currently and the next resource unit to be mapped belong to the same serving zone, mapping the resource unit to be mapped currently to one of the resource mapping identity, wherein the resource mapping identity is identical to a reference value, and
if the resource unit to be mapped currently and the next resource unit to be mapped do not belong to the same serving zone, mapping the resource unit to be mapped currently to another resource mapping identity, wherein the other resource mapping identity is different from a reference value.

19. The method of claim 5, wherein the reference value comprises one of:
a prearranged value, which corresponds to one of a value of a resource mapping identity of the initial resource unit from which mapping starts, a value of a certain bit in an identity of a receiver configured by a system, and a value in a system signaling known by a transmitter and the receiver; and
a value of the resource mapping identity of a previously mapped resource unit.

20. The method of claim 2, wherein the resource units corresponding to the at least one resource mapping identities in the resource allocation indication message indicate start points or end points of corresponding serving zones.

21. The method of claim 3, wherein the resource units corresponding to the at least one resource mapping identities in the resource allocation indication message indicate start points or end points of corresponding serving zones.

22. The method of claim 10, wherein the mapping scheme includes at least one of the first mapping scheme, the second mapping scheme, a third mapping scheme, and a fourth mapping scheme,
wherein the third mapping scheme includes:
if the resource unit to be mapped currently and the next resource unit to be mapped belong to the same serving zone, mapping the resource unit to be mapped currently to one of resource mapping identity, wherein the resource mapping identity is different from a reference value, and
if the resource unit to be mapped currently and the next resource unit to be mapped do not belong to the same serving zone, mapping the resource unit to be mapped currently to another resource mapping identity, wherein the other resource mapping identity is identical to a reference value, and
wherein the fourth mapping scheme includes:
if the resource unit to be mapped currently and the next resource unit to be mapped belong to the same serving zone, mapping the resource unit to be mapped currently to one of the resource mapping identity, wherein the resource mapping identity is identical to a reference value, and
if the resource unit to be mapped currently and the next resource unit to be mapped do not belong to the same serving zone, mapping the resource unit to be mapped currently to another resource mapping identity, wherein the other resource mapping identity is different from a reference value.

23. The method of claim 11, wherein the mapping scheme includes at least one of the first mapping scheme, the second mapping scheme, a third mapping scheme, and a fourth mapping scheme,
wherein the third mapping scheme includes:
if the resource unit to be mapped currently and the next resource unit to be mapped belong to the same serving zone, mapping the resource unit to be mapped currently to one of resource mapping identity, wherein the resource mapping identity is different from a reference value, and if the resource unit to be mapped currently and the next resource unit to be mapped do not belong to the same serving zone, mapping the resource unit to be mapped currently to another resource mapping identity, wherein the other resource mapping identity is identical to a reference value; and wherein the fourth mapping scheme includes:

if the resource unit to be mapped currently and the next resource unit to be mapped belong to the same serving zone, mapping the resource unit to be mapped currently to one of the resource mapping identity, wherein the resource mapping identity is identical to a reference value, and if the resource unit to be mapped currently and the next resource unit to be mapped do not belong to the same serving zone, mapping the resource unit to be mapped currently to another resource mapping identity, wherein the other resource mapping identity is different from a reference value.

24. A transmitter in an information transmission system which is operable to generate a resource allocation indication message to perform all or part of the method of claim 2.

25. A transmitter in an information transmission system which is operable to generate a resource allocation indication message to perform all or part of the method of claim 3.

26. A transmitter in an information transmission system which is operable to generate a resource allocation indication message to perform all or part of the method of claim 4.

27. A transmitter in an information transmission system which is operable to generate a resource allocation indication message to perform all or part of the method of claim 5.

28. A transmitter in an information transmission system which is operable to generate a resource allocation indication message to perform all or part of the method of claim 6.

29. A transmitter in an information transmission system which is operable to generate a resource allocation indication message to perform all or part of the method of claim 7.

30. A transmitter in an information transmission system which is operable to parse a resource allocation indication message to perform all or part of the method of claim 10.

31. A receiver in an information transmission system which is operable to parse a resource allocation indication message to perform all or part of the method of claim 11.

32. A receiver in an information transmission system which is operable to parse a resource allocation indication message to perform all or part of the method of claim 12.

* * * * *